US007122920B2

(12) United States Patent
Mizumaki

(10) Patent No.: US 7,122,920 B2
(45) Date of Patent: Oct. 17, 2006

(54) MOTOR AND OPTICAL APPARATUS

(75) Inventor: Masao Mizumaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 11/077,034

(22) Filed: Mar. 11, 2005

(65) Prior Publication Data

US 2005/0218743 A1    Oct. 6, 2005

(30) Foreign Application Priority Data

Apr. 5, 2004    (JP)    ............................ 2004-110711

(51) Int. Cl.
 *H02K 37/00*    (2006.01)
 *H02K 37/12*    (2006.01)
 *H02K 37/14*    (2006.01)
 *G02B 7/04*    (2006.01)
 *G02B 7/08*    (2006.01)

(52) U.S. Cl. .................... 310/49 R; 310/185; 310/216; 396/133; 396/463

(58) Field of Classification Search ............. 310/49 R, 310/185, 67 R, 216, 254; 396/133, 463, 396/508, 464; 335/272
See application file for complete search history.

(56) References Cited

U.S. PATENT DOCUMENTS

| | | | | |
|---|---|---|---|---|
| 5,831,356 | A * | 11/1998 | Aoshima | ................... 310/49 R |
| 6,081,053 | A * | 6/2000 | Maegawa et al. | ......... 310/49 R |
| 6,509,666 | B1 * | 1/2003 | Huang et al. | ................ 310/254 |
| 6,559,569 | B1 * | 5/2003 | Aoshima | ................... 310/112 |
| 6,591,066 | B1 | 7/2003 | Aoshima | ................... 396/133 |
| 6,710,563 | B1 | 3/2004 | Mizumaki et al. | .......... 318/437 |
| 6,727,672 | B1 | 4/2004 | Mizumaki | ................... 318/437 |
| 6,747,385 | B1 * | 6/2004 | Huang et al. | ................ 310/216 |
| 6,798,093 | B1 * | 9/2004 | Aoshima | ................... 310/49 R |
| 2003/0007799 | A1 | 1/2003 | Aoshima | ..................... 396/133 |

FOREIGN PATENT DOCUMENTS

| | | |
|---|---|---|
| JP | 7-213041 | 8/1995 |
| JP | 9-331666 | 12/1997 |
| JP | 2000-50601 | 2/2000 |
| JP | 2003-23763 | 1/2003 |

* cited by examiner

*Primary Examiner*—Tran Nguyen
(74) *Attorney, Agent, or Firm*—Fitzpatrick, Cella, Harper & Scinto

(57) ABSTRACT

Provided are a motor and an optical apparatus each including: a rotatable rotor having a cylindrical magnet; a first coil; a first outer magnetic pole portion which is disposed at a center portion of the first coil and which is opposed to an outer circumferential surface of the magnet within a first predetermined angle range; a second outer magnetic pole portion which is adjacent to an outer circumference of the first coil and which is opposed to the outer circumferential surface of the magnet; a first inner magnetic pole portion which is adjacent to the outer circumference of the first coil and which is opposed to an inner circumferential surface of the magnet; a second coil; a third outer magnetic pole portion which is disposed at a center portion of the second coil and which is opposed to the outer circumferential surface of the magnet within a second predetermined angle range; a fourth outer magnetic pole portion which is adjacent to an outer circumference of the second coil and which is opposed to the outer circumferential surface of the magnet; and a second inner magnetic pole portion which is adjacent to the outer circumference of the second coil and which is opposed to the inner circumferential surface of the magnet. Accordingly, there are provided a motor and an optical apparatus which realize higher output without impairing miniaturization.

12 Claims, 12 Drawing Sheets

MOTOR AND OPTICAL APPARATUS

BACKGROUND OF THE INVENTION

1. Field of the Invention

The present invention relates to a cylindrical motor and an optical apparatus using the motor.

2. Related Background Art

FIG. 17 is a longitudinal sectional view showing a structural example of a conventional stepping motor, and FIG. 18 is a partial sectional view schematically showing a state of a magnetic flux that flows from a stator of the stepping motor shown in FIG. 17.

In the figures, two bobbins 101 having stator coils 105 concentrically wound therearound are juxtaposed in an axial direction, and are held between and fixed to separate stator yokes 106, respectively. An inner diameter surface of each of the stator yokes 106 is formed with stator teeth 106a and 106b, which are alternately arranged in a circumferential direction of the inner diameter surface of the bobbin 101. The stator yokes 106, each of which is integrally formed with the stator tooth 106a or 106b, are fixed to two cases 103, respectively. Thus, there are formed two stators 102 respectively corresponding to the two stator coils 105 for excitation. A flange 115 and a bearing 108 are fixed to one of the two cases 103, and another bearing 108 is fixed to the other case 103. A rotor 109 is composed of a rotor magnet 111 fixed to a rotor shaft 110, and the rotor magnet 111 forms a radially extending gap portion with respect to the stator yoke 106 of each of the stators 102. The rotor shaft 110 is rotatably supported by the two bearings 108.

In the conventional compact stepping motor described above, the cases 103, the bobbins 101, the stator coils 105, and the stator yokes 106 are concentrically disposed in the outer circumference of the rotor 109, which raises a problem in that the motor is increased in outer dimensions. Further, as shown in FIG. 18, a magnetic flux, which is generated due to energization of the stator coils 105, mainly passes through an end face $106a_1$ of the stator tooth 106a and an end face $106b_1$ of the stator tooth 106b. Thus, there has been a problem in that the magnetic flux does not act on the rotor magnet 111 effectively, making it impossible to attain higher output of the motor.

With the objective of solving the above-mentioned problems, there has been proposed a motor with the structure as disclosed in Japanese Patent Application Laid-Open No. H09-331666 (U.S. Pat. No. 5,831,356). FIG. 19 is a longitudinal sectional view schematically showing the motor. In this figure, reference numeral 311 denotes a magnet; 312 denotes a first coil; 313 denotes a second coil; 314 denotes a first stator; 314a and 314b denote first outer magnetic pole portions; 314c and 314d denote first inner magnetic pole portions; 315 denotes a second stator; 315a and 315b denote second outer magnetic pole portions; 315c and 315d denote second inner magnetic pole portions; and 316 denotes a connecting ring for holding the first stator 314 and the second stator 315. Reference numeral 317 denotes an output shaft to which the magnet 311 is fastened and which rotates integrally with the magnet 311. The output shaft 317 is rotatably supported by respective bearings 314e and 315e of the first stator 314 and the second stator 315.

The motor in accordance with this proposal is structured such that: there is formed the magnet 311 composed of a cylindrical permanent magnet circumferentially divided into equal parts to be alternately magnetized to different poles; the first coil 312, the magnet 311, and the second coil 313 are sequentially arranged in an axial direction of the magnet 311; the first outer magnetic pole portions 314a and 314b and the first inner magnetic pole portions 314c and 314d, which are excited by the first coil 312, are opposed to the outer circumferential surface and inner circumferential surface of the magnet 311 on one axial side thereof, respectively; the second outer magnetic pole portions 315a and 315b and the second inner magnetic pole portions 315c and 315d, which are excited by the second coil 313, are opposed to the outer circumferential surface and inner circumferential surface of the magnet 311 on the other axial side thereof, respectively; and the output shaft 317 as a rotary shaft is taken out of the cylindrical magnet 311. The motor with this structure can realize higher output and reduction in outer dimensions of the motor. Further, the reduction of the magnet 311 in thickness can reduce the distance between the first outer magnetic pole portion and the first inner magnetic pole portion and the distance between the second outer magnetic pole portion and the second inner magnetic pole portion. Thus, a magnetic resistance in a magnetic circuit can be decreased. Therefore, a large amount of magnetic flux can be generated, thus making it possible to maintain high output, even if a small current is flown through the first coil 312 and the second coil 313.

However, the motor of the type described in Japanese Patent Application Laid-Open No. H09-331666 (U.S. Pat. No. 5,831,356) has a disadvantage that the length in the axial direction is long as in the conventional stepping motor shown in FIG. 17.

As a motor whose axial length is short, there is one shown in, for example, FIG. 20 (refer to Japanese Patent Application Laid-Open Nos. H07-213041 and 2000-50601). This motor is constituted of plural coils 301, 302, and 303 and a disc-shape magnet 304. The coils 301 to 303 each have a thin coin shape, as shown in FIG. 20, and the axes of the coils are arranged parallel to the axis of the magnet 304. Further, the disc-shape magnet 304 is magnetized in an axial direction of the disc, and a magnetized surface of the magnet 304 is arranged to be opposed to the axes of the coils 301 to 303. In this case, as shown by arrows in FIG. 21, the magnetic fluxes generated from the coils 301 to 303 do not completely and effectively act on the magnet 304. Further, as shown in FIG. 21, the center of rotational force acting on the magnet 304 is at the position separated from an outer diameter of the motor by L, and thus, a small torque is generated relative to the motor size. Moreover, a center portion of the motor is occupied by the coils 301 to 303 and the magnet 304, which makes arrangement of other components in the motor difficult. Furthermore, since the plural coils are required, there is a disadvantage in that energization control on the coils is complicated, and that costs rise.

On the other hand, there is known a device for driving diaphragm blades, a shutter, a lens, or the like with the use of the above-described motor of Japanese Patent Application Laid-Open No. H09-331666 (U.S. Pat. No. 5,831,356) or the like. However, the motor of this type has an elongate cylindrical shape. Thus, when used as a driving source for the diaphragm blades, shutter, lens, or the like, the motor needs to be arranged to be in parallel with an optical axis within a lens barrel of a camera. Therefore, a radial dimension of the lens barrel has the total value of not only a radius of a lens and a radius of a throttle opening but also a diameter of the motor.

FIG. 22 is a diagram for explaining the size of a cross section of a lens barrel base plate or light amount adjusting device in the case of using the cylindrical stepping motor as shown in FIG. 19. In FIG. 22, the motor is represented by symbol M; the lens barrel base plate or light amount adjusting device, 400; an opening portion, 401; a diameter of the motor M, D1; a diameter of the opening portion 401, D2; and a diameter of the lens barrel base plate or light amount adjusting device 400, D3. Based on the above, the diameter D3 of the lens barrel base plate or light amount adjusting device 400 is at least more than (2×D1+D2). When the motor shown in FIG. 17 is used, the diameter D1 of the motor M corresponds to the total of the diameters of the coil, magnet, and stator, which means that the diameter D3 of the light amount adjusting device 400 becomes extremely large.

Further, in the case of the motors of the types described in FIGS. 17 and 19, the position where the magnetic flux generated through energization of the first coil acts on the magnet deviates from the position where the magnetic flux generated through energization of the second coil acts on the magnet in the axial direction of the magnet. Therefore, in the case where nonuniformity in magnetization exists between the positions in a direction parallel to the axis (that is, the position on the 314 side and the position on the 315 side in FIG. 19), the accuracy of the rotation stop position of the magnet may deteriorate.

In view of the above, the applicant of the present invention has proposed a motor that solves the above-mentioned problems (refer to Japanese Patent Application Laid-Open No. 2003-23763 (U.S. Pat. No. 6,591,066)). The motor is provided with: a rotatable rotor having a cylindrical magnet, which is divided into equal portions in a circumferential direction to be alternately magnetized to different poles; a first outer magnetic pole portion which is excited by a first coil and opposed to an outer circumferential surface of the magnet within a first predetermined angle range; a first inner magnetic pole portion which is excited by the first coil and opposed to an inner circumferential surface of the magnet; a second outer magnetic pole portion which is excited by a second coil and opposed to the outer circumferential surface of the magnet within a second predetermined angle range; and a second inner magnetic pole portion which is excited by the second coil and opposed to the inner circumferential surface of the magnet. In the motor, the first outer magnetic pole portion and the second outer magnetic portion are arranged on the same circumference with the magnet as the center.

Although the motor disclosed in Japanese Patent Application Laid-Open No. 2003-23763 is not susceptible to an influence of nonuniformity in magnetization of the magnet and has a short axial length, the motor has a structure in which all the outer magnetic pole portions are arranged in the inner circumferences of the coils. Thus, there has been a problem in that, when the outer diameter of the motor is to be reduced, the range in which the outer magnetic pole portion opposes the outer circumference of the magnet is limited (the area where the outer magnetic pole portion does not oppose the outer circumference of the magnet is large), which leads to low output.

SUMMARY OF THE INVENTION

The present invention has been made in view of the above, and therefore has an object to provide a motor and an optical apparatus which enable higher output without impairing miniaturization.

To attain the above object, according to one aspect of the present invention, there is provided a motor including: a rotatable rotor having a cylindrical magnet which is divided into n portions in a circumferential direction to be alternately magnetized to different poles; a first coil disposed adjacent to the magnet in a direction of a rotary shaft of the rotor; a first outer magnetic pole portion which is excited by the first coil, which is disposed at a center portion of the first coil, and which is opposed to an outer circumferential surface of the magnet within a first predetermined angle range; a second outer magnetic pole portion which is excited by the first coil, which is adjacent to an outer circumference of the first coil, and which is opposed to the outer circumferential surface of the magnet; a first inner magnetic pole portion which is excited by the first coil, which is adjacent to the outer circumference of the first coil, and which is opposed to an inner circumferential surface of the magnet; a second coil which is adjacent to the magnet in the direction of the rotary shaft of the rotor and which is disposed on the substantially same plane as the first coil; a third outer magnetic pole portion which is excited by the second coil, which is disposed at a center portion of the second coil, and which is opposed to the outer circumferential surface of the magnet within a second predetermined angle range; a fourth outer magnetic pole portion which is excited by the second coil, which is adjacent to an outer circumference of the second coil, and which is opposed to the outer circumferential surface of the magnet; and a second inner magnetic pole portion which is excited by the second coil, which is adjacent to the outer circumference of the second coil, and which is opposed to the inner circumferential surface of the magnet.

In the motor with the above-described structure, the magnetic flux generated by the first coil crosses the magnet between the first outer magnetic pole portion and the first inner magnetic pole portion, and the magnetic flux generated by the second coil crosses the magnet between the third outer magnetic pole portion and the second inner magnetic pole portion. Thus, the magnetic fluxes effectively act on the magnet. As a result, the output can be improved. Further, the magnetic flux generated by the first coil also acts on the second outer magnetic pole portion, and the magnetic flux generated by the second coil also acts on the fourth outer magnetic pole portion, which leads to a further improvement in motor output. In addition, the number of the outer magnetic poles that oppose the outer circumference of the magnet can be increased without increasing the outer diameter of the motor. Therefore, the rotation balance is improved, which leads to an improved silencing effect.

In further aspect of the present invention, it is preferable that the first outer magnetic pole portion, the second outer magnetic pole portion, the third outer magnetic pole portion, and the fourth outer magnetic pole portion be formed of the same member.

In the motor with the above-described structure, an error in relative positions can be suppressed to be small. Also, there can be provided a motor which needs a smaller number of components and whose structure is simple, which leads to reduction in costs.

In further aspect of the present invention, it is preferable that the first outer magnetic pole portion and the third outer magnetic pole portion each have a comb-tooth shape that extends in a direction of a rotary shaft of the rotor.

In the motor with the above-described structure, it is possible to achieve a reduction in size in the direction perpendicular to the rotary shaft and facilitate assembly of the coils.

In further aspect of the present invention, it is preferable that with a rotation center of the rotor taken as a vertex, an angle α formed by a center of a part of the first outer magnetic pole portion which is opposed to the outer circumferential surface of the magnet, and a center of a part of the second outer magnetic pole portion which is opposed to the outer circumferential surface of the magnet, and also the angle α formed by a center of a part of the third outer magnetic pole portion which is opposed to the outer circumferential surface of the magnet, and a center of a part of the fourth outer magnetic pole portion which is opposed to the outer circumferential surface of the magnet, be set in a range of $(270/n) \leq \alpha \leq (450/n)$.

In the motor with the above-described structure, not only the first outer magnetic pole portion but also the second outer magnetic pole portion effectively acts on the magnet, and not only the third outer magnetic pole portion but also the fourth outer magnetic pole portion effectively acts on the magnet.

In further aspect of the present invention, it is preferable that an angle θ, which is formed by the first outer magnetic pole portion and the third outer magnetic pole portion, with a rotation center of the rotor taken as a vertex, be expressed by $\theta = (180 - 180/n)$.

The motor with the above-described structure can be operated as a motor which enables bidirectional rotation by controlling an energization timing of the coils.

To attain the above-mentioned object, according to another aspect of the present invention, there is provided an optical apparatus including: a rotatable rotor having a cylindrical magnet which is divided into n portions in a circumferential direction to be alternately magnetized to different magnetic poles; a first coil disposed adjacent to the magnet in a direction of a rotary shaft of the rotor; a first outer magnetic pole portion which is excited by the first coil, which is disposed at a center portion of the first coil, and which is opposed to an outer circumferential surface of the magnet within a first predetermined angle range; a second outer magnetic pole portion which is excited by the first coil, which is adjacent to an outer circumference of the first coil, and which is opposed to the outer circumferential surface of the magnet; a first inner magnetic pole portion which is excited by the first coil, which is adjacent to the outer circumference of the first coil, and which is opposed to an inner circumferential surface of the magnet; a second coil which is adjacent to the magnet in the direction of the rotary shaft of the rotor and which is disposed on the substantially same plane as the first coil; a third outer magnetic pole portion which is excited by the second coil, which is disposed at a center portion of the second coil, and which is opposed to the outer circumferential surface of the magnet within a second predetermined angle range; a fourth outer magnetic pole portion which is excited by the second coil, which is adjacent to an outer circumference of the second coil, and which is opposed to the outer circumferential surface of the magnet; a second inner magnetic pole portion which is excited by the second coil, which is adjacent to the outer circumference of the second coil, and which is opposed to the inner circumferential surface of the magnet; and an opening amount adjusting member which changes an opening area of an opening portion as an optical path in correspondence with rotation of the rotor.

In the optical apparatus with the above-described structure, there can be provided the optical apparatus with relatively little protrusion in an optical axis direction due to the motor. Further, the length in a direction parallel to the optical axis can be made short in the motor for driving the opening amount adjusting member. Also, there can be provided the optical apparatus provided with an inexpensive and compact motor which does not cause obstruction to other lens and structures and which realizes improvement in output.

To attain the above-mentioned object, according to another aspect of the present invention, there is provided an optical apparatus including: a cylindrical magnet which is divided into n portions in a circumferential direction to be alternately magnetized to different magnetic poles; a rotor which is fixed to an inner diameter portion of the magnet and which is formed of a soft magnetic material; a first coil which is disposed adjacent to the rotor and adjacent to the magnet in an axial direction of the rotor; a first outer magnetic pole portion which is excited by the first coil, which is disposed at a center portion of the first coil, and which is opposed to an outer circumferential surface of the magnet within a first predetermined angle range; a second outer magnetic pole portion which is excited by the first coil, which is adjacent to an outer circumference of the first coil, and which is opposed to the outer circumferential surface of the magnet; a second coil which is adjacent to the rotor, which is adjacent to the magnet in the axial direction of the rotor, and which is disposed on the substantially same plane as the first coil; a third outer magnetic pole portion which is excited by the second coil, which is disposed at a center portion of the second coil, and which is opposed to the outer circumferential surface of the magnet within a second predetermined angle range; and a fourth outer magnetic pole portion which is excited by the second coil, which is adjacent to an outer circumference of the second coil, and which is opposed to the outer circumferential surface of the magnet.

In the motor with the above-described structure, when the part of the rotor which is opposed to the first outer magnetic pole portion, the rotor being fixed to the inner circumferential surface of the magnet, is termed the first inner magnetic pole portion, the magnetic flux generated by the first coil passes between the first outer magnetic pole portion opposed to the outer circumferential surface of the magnet and the first inner magnetic pole portion of the rotor fixed to the inner circumferential surface of the magnet. Thus, the magnetic flux effectively acts on the magnet. At this time, since it is not necessary to provide a gap between the inner circumferential surface of the magnet and the first inner magnetic pole portion of the rotor opposed to the inner circumferential surface of the magnet, the distance between the outer magnetic pole portion and the inner magnetic pole portion can be reduced. Therefore, the magnetic resistance is reduced, thereby being capable of increasing the output. Similarly, when the part of the rotor which is opposed to the third outer magnetic pole portion, the rotor being fixed to the inner circumferential surface of the magnet, is termed the second inner magnetic pole portion, the magnetic flux generated by the second coil passes between the third outer magnetic pole portion opposed to the outer circumferential surface of the magnet and the second inner magnetic pole portion of the rotor fixed to the inner circumferential surface of the magnet. Thus, the magnetic flux effectively acts on the magnet. At this time, since it is not necessary to provide a gap between the inner circumferential surface of the magnet and the second inner magnetic pole portion of the rotor opposed to the inner circumferential surface of the magnet, the distance between the outer magnetic pole portion and the inner magnetic pole portion can be reduced. Therefore, the magnetic resistance is reduced, thereby being capable of increasing the output. Further, the first inner magnetic pole portion and the second inner magnetic pole portion are each constituted by the rotor. This realizes easier manufacturing and lower costs in comparison with the case where the outer magnetic pole portion and the inner magnetic pole portion are connected together or integrally formed. Further, the rotor is fixed to the inner diameter portion of the magnet, which leads to enhanced strength. Moreover, the magnetic flux generated by the first coil also acts on the second outer magnetic pole portion, and the magnetic flux generated by the second coil also acts on the fourth outer magnetic pole portion. This leads to a further improvement of the motor output. Furthermore, the number of the outer magnetic poles that oppose the outer circumference of the magnet can be increased without increasing the outer diameter of the motor. Therefore, the rotation balance is improved, which leads to an improved silencing effect.

The above and other objects, features, and advantages of the invention will become more apparent from the following detailed description taken in conjunction with the accompanying drawings.

DESCRIPTION OF THE PREFERRED EMBODIMENTS

Hereinafter, the present invention will be described in detail based on the accompanying drawings.

A motor and an optical apparatus in the present invention are as shown in Embodiment 1 and Embodiment 2 described below.

Embodiment 1

Figure 1:
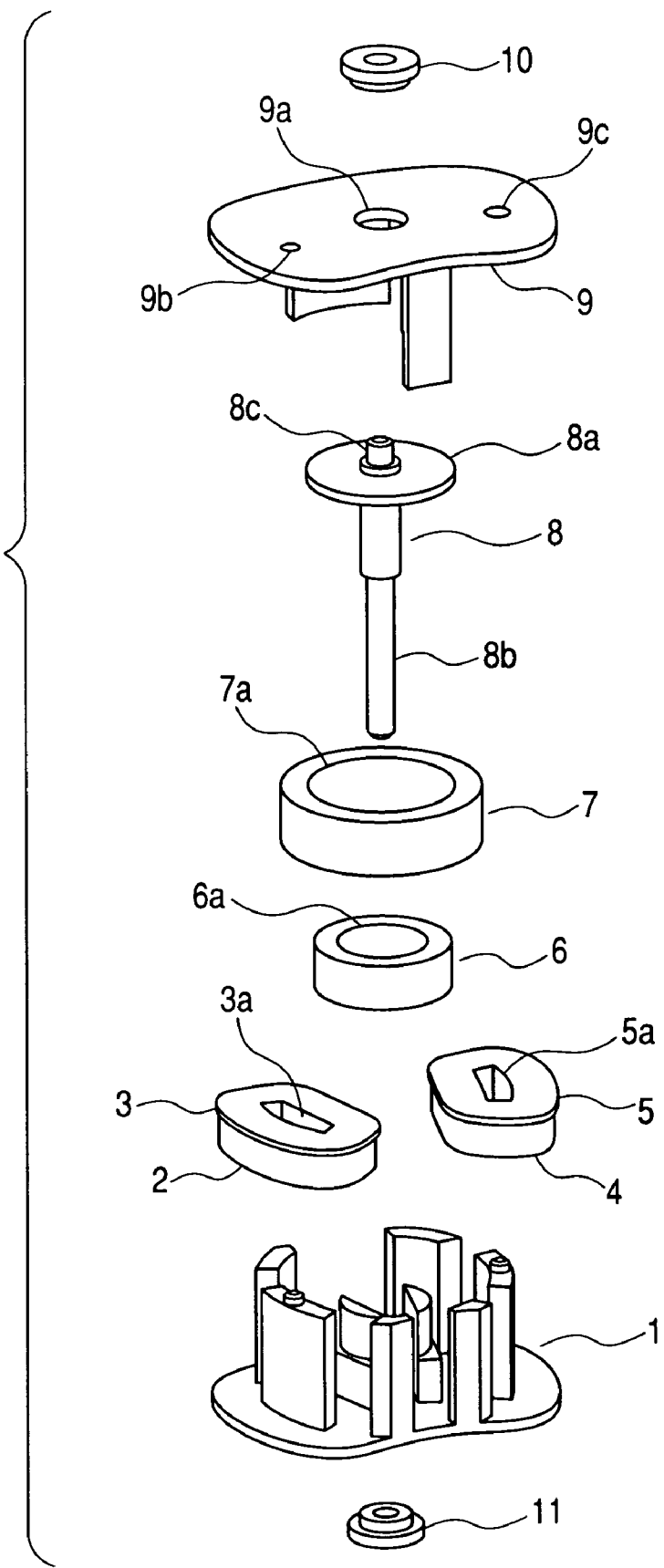
FIG. 1 is an exploded perspective view of a motor in accordance with Embodiment 1 of the present invention.
Figure 2:
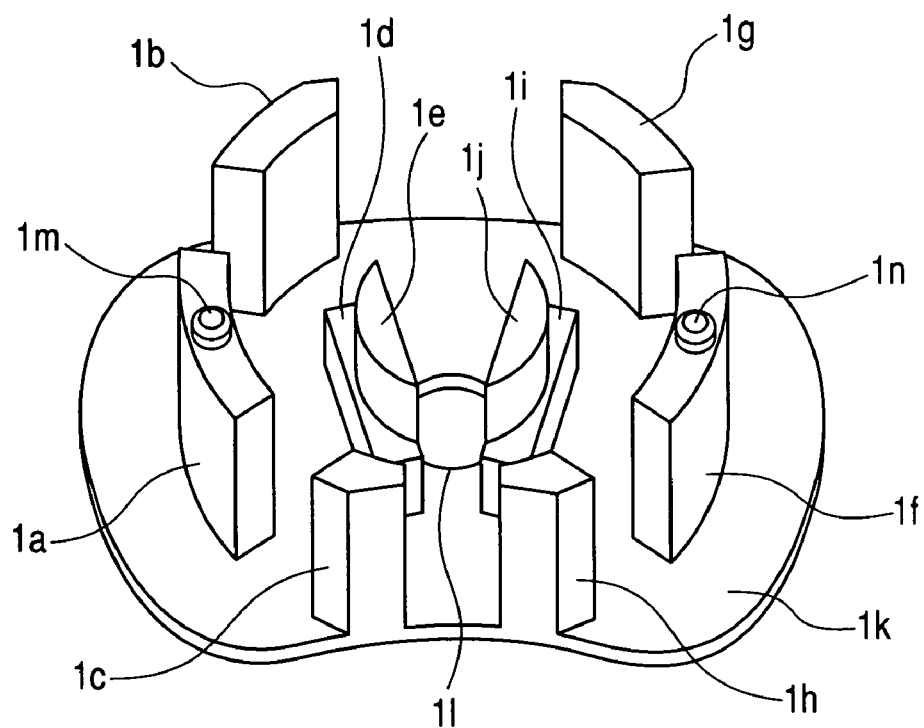
FIG. 2 is an enlarged view of a stator in the motor of FIG. 1.
Figure 3:
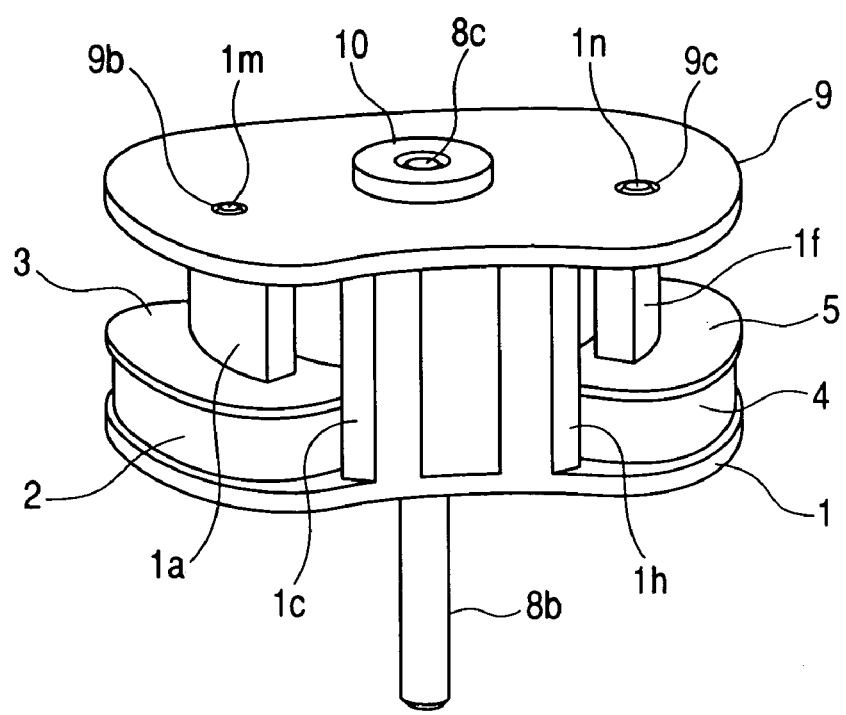
FIG. 3 is a view showing a complete assembled state of the motor of FIG. 1.
Figure 4:
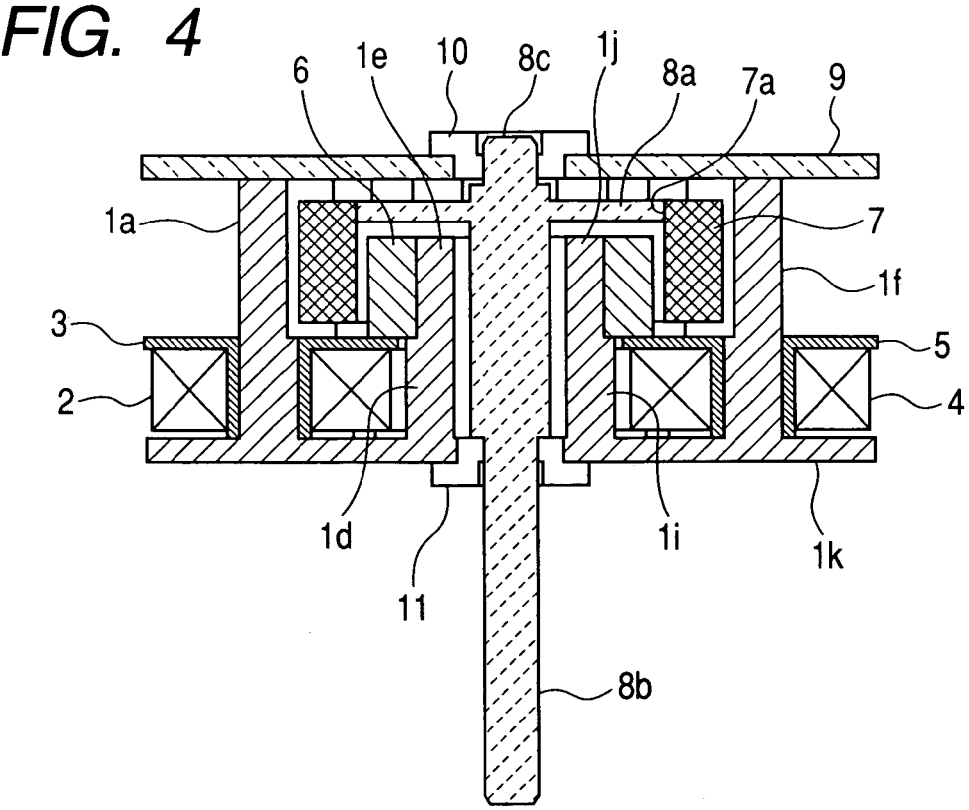
FIG. 4 is a sectional view taken along a plane in parallel to an axial direction, the plane passing through coils and a rotor shaft of the motor of FIG. 1.

FIGS. 1 to 10 are views in accordance with Embodiment 1 of the present invention. FIG. 1 is an exploded perspective view of the motor; FIG. 2 is an enlarged view of a stator that is a structural component of the motor in FIG. 1; FIG. 3 is a view of a complete assembled state of the motor in FIG. 1; and FIG. 4 is a sectional view of a surface in parallel to an axial direction, which is taken along coils and a rotor shaft of the motor in FIG. 1.

In FIGS. 1 to 4, reference numeral 1 denotes a stator composed of a soft magnetic material, and the stator has a first outer tooth portion 1*a*, second outer tooth portion 1*b*, and third outer tooth portion 1*c*. The first outer tooth portion 1*a* forms a first outer magnetic pole portion, and the second outer tooth portion 1*b* and the third outer tooth portion 1*c* form a second outer magnetic pole portion. Symbol 1*d* denotes a first inner tooth portion. Symbol 1*e* denotes a first fitting projection portion, which is formed on one end of the first inner tooth portion 1*d* and attached with an auxiliary yoke 6 described later. The first inner tooth portion 1*d*, the first fitting projection portion 1*e*, and a part of the auxiliary yoke 6 form a first inner magnetic pole portion. Symbol 1*f* denotes a fourth outer tooth portion; 1*g*, a fifth outer tooth portion; and 1*h*, a sixth outer tooth portion. The fourth outer tooth portion 1*f* forms a third outer magnetic pole portion, and the fifth outer tooth portion 1*g* and the sixth outer tooth portion 1*h* form a fourth outer magnetic pole portion. Symbol 1*i* denotes a second inner tooth portion. Symbol 1*j* denotes a second fitting projection portion, which is formed on one end of the second inner tooth portion 1*i* and attached with the auxiliary yoke 6. The second inner tooth portion 1*i*, the second fitting projection portion 1*j*, and a part of the auxiliary yoke 6 form a second inner magnetic pole portion. Symbol 1*k* denotes a flat plate portion, which is connected with each of ends of the first outer tooth portion 1*a*, second outer tooth portion 1*b*, third outer tooth portion 1*c*, first inner tooth portion 1*d*, fourth outer tooth portion 1*f*, fifth outer tooth portion 1*g*, sixth outer tooth portion 1*h*, and second inner tooth portion 1*i*. Symbol 11 denotes a bearing attaching portion attached with a bearing 11 described later.

The first outer tooth portion 1*a*, second outer tooth portion 1*b*, third outer tooth portion 1*c*, first inner tooth portion 1*d*, fourth outer tooth portion 1*f*, fifth outer tooth portion 1*g*, sixth outer tooth portion 1*h*, and second inner tooth 1*i* each are formed to have a comb-tooth shape that extends in a direction parallel to a rotary shaft 8 described later.

The stator 1 in Embodiment 1 is different from that disclosed in Japanese Patent Application Laid-Open No. H09-331666 (U.S. Pat. No. 5,831,356). The first outer magnetic pole portion, second outer magnetic pole portion, third outer magnetic pole portion, and fourth outer magnetic pole portion are structured integrally. Thus, the mutual error is reduced among the first outer magnetic pole portion, second outer magnetic pole portion, third outer magnetic pole portion, and fourth outer magnetic pole portion. As a result, variation in performance of the motor due to assembly can be suppressed to the minimum.

Reference numeral 2 denotes a first coil, and reference numeral 3 denotes a first bobbin wound around by the first coil 2. In the state of being fixed to the first bobbin 3, the first coil 2 is fixed such that the first outer tooth portion 1*a* of the stator 1 is arranged in the inner circumference. In this state, the second outer tooth portion 1*b*, third outer tooth portion 1*c*, and first inner tooth portion 1*d* are adjacent to an outer circumference of the first coil 2. Through energization to the first coil 2, the first outer tooth portion 1*a*, second outer tooth portion 1*b*, third outer tooth portion 1*c*, first inner tooth portion 1*d*, first fitting projection portion 1*e*, and a part of auxiliary yoke 6 described later, which opposes the first outer tooth portion 1*a*, are excited. At this point, the first outer tooth portion 1*a*, second outer tooth portion 1*b*, third outer tooth portion 1*c*, first inner tooth portion 1*d*, first fitting projection portion 1*e*, and a part of auxiliary yoke 6 opposing the first outer tooth portion 1*a* are magnetized to different poles one another. That is, the first outer magnetic pole portion, second outer magnetic pole portion, and first inner magnetic pole portion are magnetized to poles different from one another.

Reference numeral 4 denotes a second coil, and reference numeral 5 denotes a second bobbin wound around by the second coil 4. In the state of being fixed to the second bobbin 5, the second coil 4 is fixed such that the fourth outer tooth portion 1*f* of the stator 1 is arranged in the inner circumference. In this state, the fifth outer tooth portion 1*g*, sixth outer tooth portion 1*h*, and second inner tooth portion 1*i* are adjacent to an outer circumference of the second coil 4. Through energization to the second coil 4, the fourth outer tooth portion 1*f*, fifth outer tooth portion 1*g*, sixth outer tooth portion 1*h*, second inner tooth portion 1*i*, second fitting projection portion 1*j*, and a part of auxiliary yoke 6 opposing the fourth outer tooth portion 1*f* are excited. At this point, the fourth outer tooth portion 1*f*, fifth outer tooth portion 1*g*, sixth outer tooth portion 1*h*, second inner tooth portion 1*i*, second fitting projection portion 1*j*, and a part of auxiliary yoke 6 described later, which opposes the fourth outer tooth portion 1*f*, are magnetized to different poles one another. That is, the third outer magnetic pole portion, fourth outer magnetic pole portion, and second inner magnetic pole portion are magnetized to poles different from one another.

The first coil 2 and the second coil 4 are arranged to be adjacent to each other on the plane of a flat plate portion 1*k* of the stator 1. Therefore, the motor can be configured so as the length in the axial direction to be shortened.

Reference numeral 6 denotes the cylindrical auxiliary yoke which is composed of a soft magnetic material. The yoke 6 is fixed by press fitting, adhesion, or the like such that an inner circumferential portion 6*a* thereof adheres to the first fitting projection portion 1*e* and second fitting projection portion 1*j* of the stator 1. The part of the auxiliary yoke 6, which opposes the first outer tooth portion 1*a*, forms the first inner magnetic pole portion in combination with the first inner tooth portion 1*d* and the first fitting projection portion 1*e*. Similarly, the part of the auxiliary yoke 6, which opposes the fourth outer tooth portion 1*f*, forms the second inner magnetic pole portion in combination with the second inner tooth portion 1*i* and the second fitting projection portion 1*j*. Further, the auxiliary yoke 6 also has a function of preventing the first bobbin 3 wound around by the first coil 2 and the second bobbin 5 wound around by the second coil 4 from falling out respectively from the outer tooth portion 1*a* and the outer tooth portion 1*f* (refer to FIG. 4).

Here, the auxiliary yoke 6 is formed separately from the first inner tooth portion 1*d* and first fitting projection portion 1*e* and the second inner tooth portion 1*i* and second fitting projection portion 1*j*. However, those parts may be integrally formed, and the resultant may be fixed later as a component separate from the stator 1.

Reference numeral 7 denotes a cylindrical magnet composed of a permanent magnet. Reference numeral 8 denotes the rotary shaft, and an outer circumferential portion of a disc portion 8*a* of the rotary shaft 8 and an inner circumferential portion 7*a* of the magnet 7 are fixed to each other by adhesion, press fitting, or the like. At this time, fixing is performed such that an upper surface of the magnet 7 and an upper surface of the disc portion 8*a* form the same surface (refer to FIG. 4). The rotary shaft 8 is provided with an output shaft portion 8*b* and a holding shaft portion 8*c*, which are rotatably held by the bearings 11 and 10 described later, respectively. As to the magnet 7, its outer circumferential surface is divided into multiple portions in a circumferential direction; that is, the portions are alternately magnetized to south poles and north poles with the number of magnetized poles being N (in Embodiment 1, 6 divisions, that is, N=6). The magnet 7 is made of a plastic magnet material formed by injection molding or the like. Thus, a radial thickness of the cylindrical shape can be extremely reduced. An inner circumferential surface of the magnet 7 may have magnetization distribution weaker than that of the outer circumferential surface, or may not be magnetized at all. Alternatively, the inner circumferential surface may be magnetized to an opposite magnetic pole with respect to the outer circumferential surface; that is, in the case where a part of the outer circumferential surface is magnetized to the south pole, a part of the inner circumferential surface corresponding to the part is magnetized to the north pole. Then, the magnet 7 and the rotary shaft 8 constitute a rotor. Here, the magnet 7 and the rotary shaft 8 adhere to be fixed to each other as the separate components. However, both the components may be integrally formed as a plastic magnet.

The first outer tooth portion 1*a*, second outer tooth portion 1*b*, third outer tooth portion 1*c*, fourth outer tooth portion 1*f*, fifth outer tooth portion 1*g*, and sixth outer tooth portion 1*h* are opposed to the outer circumferential surface of the magnet 7 with a predetermined gap, and the auxiliary yoke 6 is opposed to the inner circumferential surface of the magnet 7 with a predetermined gap. The magnet 7 is sandwiched between the first outer tooth portion 1*a*, second outer tooth portion 1*b*, and third outer tooth portion 1*c* and auxiliary yoke 6 and between the fourth outer tooth portion 1*f*, fifth outer tooth portion 1*g*, and sixth outer tooth portion 1*h* and auxiliary yoke 6.

The first outer magnetic pole portion (first outer tooth portion 1*a*) and the first inner magnetic pole portion (first inner tooth portion 1*d*, first fitting projection portion 1*e*, and a part of the auxiliary yoke 6 opposing the first outer tooth portion 1*a*) are excited by performing energization to the first coil 2. A magnetic flux across the magnet 7 is generated between the magnetic poles, and effectively acts on the magnet 7. Similarly, the third outer magnetic pole portion (fourth outer tooth portion 1*f*) and the second inner magnetic pole portion (second inner tooth portion 1*i*, second fitting projection portion 1*j*, and a part of the auxiliary yoke 6 opposing the fourth outer tooth portion 1*f*) are excited by performing energization to the second coil 4. A magnetic flux across the magnet 7 is generated between the magnetic poles, and effectively acts on the magnet 7.

Further, the magnet 7 is composed of the cylindrical plastic magnet material formed by injection molding or the like, as described above. Thus, the radial thickness of the cylindrical shape can be reduced extremely. Therefore, the distance between the first outer tooth portion 1*a* and the auxiliary yoke 6 and the distance between the fourth outer tooth portion 1*f* and the auxiliary yoke 6 can be made extremely short. As a result, magnetic resistances of a magnetic circuit which is constituted by the first coil 2, the first outer magnetic pole portion composed of the first outer tooth portion 1*a*, and the first inner magnetic pole portion composed of the auxiliary yoke 6, first fitting projection portion 1*e*, and first inner tooth portion 1*d*, and a magnetic circuit which is constituted by the second coil 4, the third outer magnetic pole portion composed of the fourth outer tooth portion 1*f*, and the auxiliary yoke 6, can be made small.

Further, the second outer magnetic pole portion (second outer tooth portion 1*b* and third outer tooth portion 1*c*) is also excited by performing energization to the first coil 2. A magnetic flux is generated also between the magnetic poles: the first outer magnetic pole portion and the second outer magnetic pole portion, and the second outer magnetic pole portion acts on the magnet 7 to which the portion is opposed. Similarly, the fourth outer magnetic pole portion (fifth outer tooth portion 1*g* and sixth outer tooth portion 1*h*) is also excited by performing energization to the second coil 4. A magnetic flux is generated also between the magnetic poles: the third outer magnetic pole portion and the fourth outer magnetic pole portion, and the fourth outer magnetic pole portion acts on the magnet 7 to which the portion is opposed.

That is, the magnetic flux generated between the magnetic poles: the first outer magnetic pole portion and the first inner magnetic pole portion, crosses and effectively acts on the magnet 7, and the magnetic flux generated between the magnetic poles: the first outer magnetic pole portion and the second outer magnetic pole portion, adjoins and acts on the magnet 7 in an auxiliary manner. Similarly, the magnetic flux generated between the magnetic poles: the third outer magnetic pole portion and the second inner magnetic pole portion, crosses and effectively acts on the magnet 7, and the magnetic flux generated between the magnetic poles: the third outer magnetic pole portion and the fourth outer magnetic pole portion, adjoins and acts on the magnet 7 in an auxiliary manner. Therefore, a large amount of magnetic flux can be generated with a small current, with which the increase in the motor output, lower power consumption, and downsizing of the coil can be attained.

The first outer tooth portion 1*a* and the fourth outer tooth portion 1*f* each are composed of a comb tooth that extends in a direction parallel to the rotary shaft 8 as the motor shaft, and thus, the maximum outer diameter (L1 in FIG. 5) of the motor can be suppressed to the minimum. For example, when the outer magnetic pole portion is composed of a yoke plate that extends in a radial direction of the magnet, the magnet needs to have a planar development, and also, is to be wound with the coil in the radial direction. As a result, the maximum outer diameter becomes large even if the length in the axial direction is short. The maximum outer diameter L1 of the motor in Embodiment 1 is determined by the thicknesses of the magnet 7, first outer tooth portion 1*a*, and fourth outer tooth portion 1*f* and the winding widths of the first coil 2 and second coil 4. Further, the first outer tooth portion 1*a* and the fourth outer tooth portion 1*f* each are composed of the comb tooth extending in the direction parallel to the motor shaft. Therefore, all of the first coil 2, the second coil 4, the auxiliary yoke 6, and the rotor composed of the magnet 7 and the rotary shaft 8 can be assembled from one direction, which leads to high assembly operability.

Reference numeral 9 denotes a cover, which is positioned such that: a projection 1*m* provided at a tip end of the first outer tooth portion 1*a* of the stator 1 is fitted into a fitting hole 9*b*; and a projection In provided at a tip end of the fourth outer tooth portion 1*f* is fitted into a fitting hole 9*c*. The cover 9 is fixed to the stator 1 in the state in which tip ends of the first outer tooth portion 1*a*, second outer tooth portion 1*b*, third outer tooth portion 1*c*, fourth outer tooth portion 1*f*, fifth outer tooth portion 1$g_1$ and sixth outer tooth portion 1*h* abut with a rear surface of the cover 9. Further, symbol 9*a* denotes a bearing attaching portion, to which the bearing 10 is fixed by caulking, adhesion, or the like. The bearing 10 is laxly fitted to the holding shaft portion 8*c* of the rotary shaft 8 to rotatably hold the rotary shaft 8. The bearings 10 and 11 rotatably hold the rotary shaft 8, and also regulate the movement of the rotary shaft 8 in the axial direction in a predetermined range in the state in which the cover 9 is fixed to the stator 1. In this state, as to the magnet 7 fixed to the rotary shaft 8, the outer circumferential surface has a predetermined gap with respect to the first outer tooth portion 1*a*, second outer tooth portion 1*b*, third outer tooth portion 1*c*, fourth outer tooth portion 1*f*, fifth outer tooth portion 1*g*, and sixth outer tooth portion 1*h*; the inner circumferential surface has a predetermined gap with respect to the auxiliary yoke 6; the upper surface has a predetermined gap with respect to the rear surface of the cover 9; and the lower surface has a predetermined gap with respect to the first bobbin 3 and the second bobbin 5. Thus, the magnet 7 is arranged to be adjacent to the first coil 2 and second coil 4 in the axial direction, and the first coil 2 and the second coil 4 are adjacent to each other on the plane perpendicular to the axial direction. Therefore, there can be provided the motor of which length is short in the axial direction.

Figure 5:
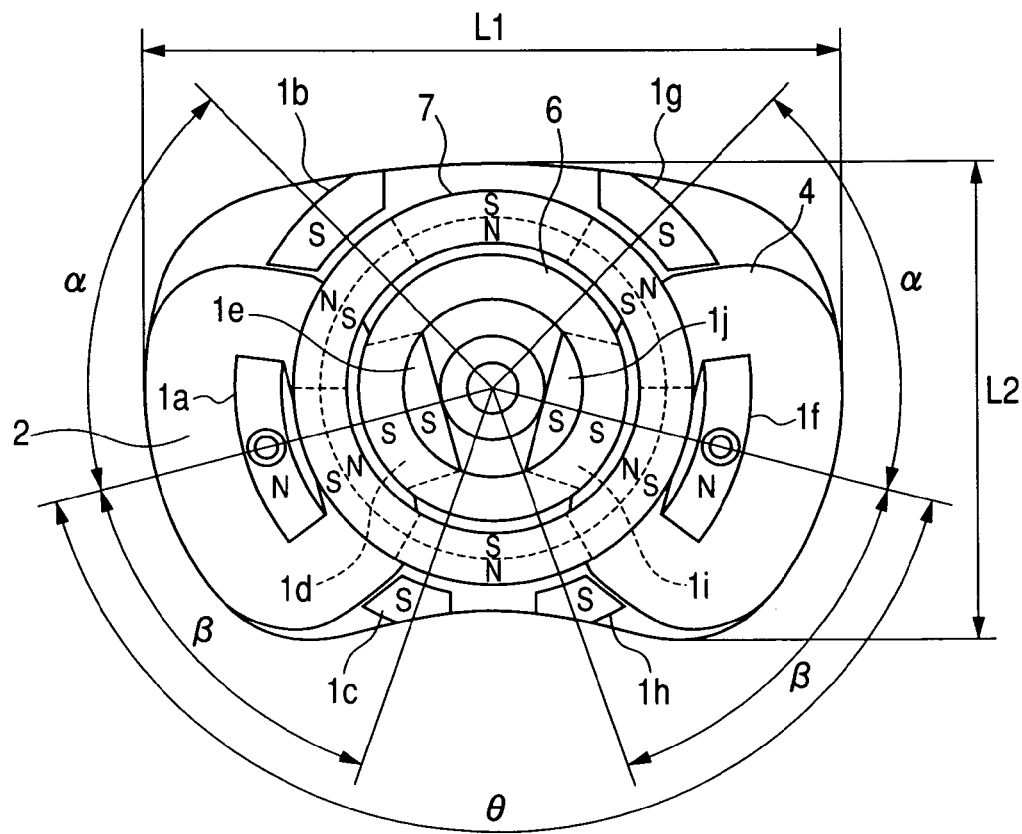
FIG. 5 is a sectional view showing the positional relationship between a magnet and the stator in the motor of FIG. 1.

FIG. 5 is a sectional view showing the positional relationship between the magnet 7 and the stator 1.

As apparent from FIG. 5, the outer circumferential surface and inner circumferential surface of the magnet 7 are uniformly divided into multiple portions in a circumferential direction (6 divisions in Embodiment 1), and the portions are alternately magnetized to south poles and north poles to form magnetized portions. When the outer circumferential surface has the south pole, its corresponding inner circumferential surface has the north pole. When the outer circumferential surface has the north pole, its corresponding inner circumferential surface has the south pole.

Here, description will be made of the positional relationship between the magnet 7 and the outer magnetic pole portions.

The first outer tooth portion 1*a*, which is the first outer magnetic pole portion, and the fourth outer tooth portion 1*f*, which is the third outer magnetic pole portion, are arranged at positions shifted from each other by θ degree in phase when a rotation center of the magnet 7 is taken as the vertex. Here, the θ degree is (180°−180°/n, where n represents the number of magnetized divisions). In Embodiment 1, the θ degree is 150° since n=6 is established. By adopting (180°−180°/n) as the θ degree, the dimension of L2 in the figure can be set at an extremely small value.

It is sufficient that the first outer tooth portion 1*a* and the fourth outer tooth portion 1*f* be arranged to be shifted from each other by (180/n)°, that is, 30° in phase in Embodiment 1 with respect to a magnetization phase of the magnet 7. The angle θ, which is made by the first outer tooth portion 1a and the fourth outer tooth portion 1f with the rotation center of the magnet 7 taken as the reference, is represented by the expression, (B×360/n−180/n). Note that B is a positive integer not more than n. The angle θ, which is made by the first outer tooth portion 1a and the fourth outer tooth portion 1f with the rotation center of the magnet 7 taken as the vertex, may be any of 30°, 90°, 150°, 210°, 270°, and 330°. However, in the case of 30° and 330°, the first coil 2 and the second coil 4 are difficult to be arranged. Further, in the case of 90° and 270°, the positions of the magnetic force of the magnet 7 and the electromagnetic force become unbalanced. Thus, vibration is easy to be generated in the rotation of the magnet 7, and the dimension of L2 cannot be reduced. In order to make the dimension of L2 small, it is sufficient that: the equation B=n/2 be established, that is, B=3 be adopted; and the θ degree be set to (180°−180°/n), that is, 150°. At this point, the positions of the magnetic force of the magnet 7 and the electromagnetic force are in a nearly bilateral-symmetrical state, and the generation of vibration is suppressed to the minimum. Further, the second outer tooth portion 1b and the third outer tooth portion 1c which form the second outer magnetic pole portion and the fifth outer tooth portion 1g and the sixth outer tooth portion 1h which form the fourth outer magnetic pole portion are respectively arranged to be opposed to different positions on the outer circumferential surface of the magnet 7. As a result, the rotation balance of the magnet 7 can be further improved.

Next, description will be made of the positional relationship between the first outer magnetic pole portion and the second outer magnetic pole portion and the positional relationship between the third outer magnetic pole portion and the fourth outer magnetic pole portion.

When the rotation center of the magnet 7 is taken as the reference, the first outer tooth portion 1a which serves as the first outer magnetic pole portion and the second outer tooth portion 1b which serves as a part of the second outer magnetic pole portion are arranged such that the respective centers of the opposing portions to the magnet 7 are shifted from each other by α degree in phase. When the α degree is set to 360/n, the pole, to which the opposing portion center of the first outer tooth portion 1a with respect to the magnet 7 is opposed, is different from the pole, to which the opposing portion center of the second outer tooth portion 1b with respect to the magnet 7 is opposed. That is, the second outer tooth portion 1b which is adjacently arranged to the outer circumference of the first coil 2 and the first outer tooth portion 1a which is arranged to the inner circumference of the first coil 2 are excited to the different poles from each other. Thus, the second outer tooth portion 1b effectively acts on the magnet 7, as the outer magnetic pole portion. Here, the opposing portion of the second outer tooth portion 1b has a predetermined width. Thus, the above effect is maintained even 1f the α degree has a range to some extent. Therefore, the second outer tooth portion 1b effectively acts on the magnet 7 as the outer magnetic pole portion even when the α degree is set to have a range of (270/n)≦α≦(450/n).

Similarly, when the rotation center of the magnet 7 is taken as the reference, the fourth outer tooth portion 1f which serves as the third outer magnetic pole portion and the fifth outer tooth portion 1g which serves as a part of the fourth outer magnetic pole portion are arranged such that the respective centers of the opposing portions to the magnet 7 are shifted from each other by the α degree in phase. The fifth outer tooth portion 1g effectively acts on the magnet 7 as the outer magnetic pole portion.

When the rotation center of the magnet 7 is taken as the reference, the first outer tooth portion 1a which serves as the first outer magnetic pole portion and the third outer tooth portion 1c which serves as a part of the second outer magnetic pole portion are arranged such that the respective centers of the opposing portions to the magnet 7 are shifted from each other by β degree in phase. When the β degree is set to 360/n, the pole, to which the opposing portion center of the first outer tooth portion 1a with respect to the magnet 7 is opposed, is different from the pole, to which the opposing portion center of the third outer tooth portion 1c with respect to the magnet 7 is opposed. That is, the third outer tooth portion 1c, which is adjacently arranged to the outer circumference of the first coil 2, and the first outer tooth portion 1a, which is arranged to the inner circumference of the first coil 2, are excited to the different poles from each other. Thus, the third outer tooth portion 1c effectively acts on the magnet 7, as the outer magnetic pole portion. Here, the opposing portion of the third outer tooth portion 1c has a predetermined width. Thus, the above effect is maintained even if the β degree has a range to some extent. Therefore, the third outer tooth portion 1c effectively acts on the magnet 7 as the outer magnetic pole portion even when the β degree is set to have a range of (270/n)≦β≦(450/n).

Similarly, when the rotation center of the magnet 7 is taken as the reference, the fourth outer tooth portion 1f, which serves as the third outer magnetic pole portion, and the sixth outer tooth portion 1h, which serves as a part of the fourth outer magnetic pole portion, are arranged such that the respective centers of the opposing portions to the magnet 7 are shifted from each other by the β degree in phase. The sixth outer tooth portion 1h effectively acts on the magnet 7, as the outer magnetic pole portion. Note that, since n=6 is established in Embodiment 1, it is sufficient that the α degree and the β degree each are set within a range of 45° to 75°. Further, the α degree and the β degree are most desirably the same, but may not be the same depending on a driving method (they should be desirably the same in terms of step precision in 1-2 phase excitation drive, but may somewhat differ without inconvenience in 2 phase excitation drive).

With the above-described structure, the first outer tooth portion 1a as the first outer magnetic pole portion and the second outer tooth portion 1b and third outer tooth portion 1c, which form the second outer magnetic pole portion, and the fourth outer tooth portion 1f as the third outer magnetic pole portion and the fifth outer tooth portion 1g and sixth outer tooth portion 1h, which form the fourth outer magnetic pole portion, are structured to be opposed to the same magnet 7 in the respective different angle ranges. Therefore, the magnet 7 can be structured to be short in the axial direction, which enables a short motor from the viewpoint of the length in the direction parallel to the axial direction.

As the major characteristic of the above structure, when attention is paid to a part of the outer circumferential surface of the magnet 7, the rotation of the magnet 7 makes the magnetic flux between the first outer magnetic pole portion and the second outer magnetic pole portion, which are excited by the first coil 2, and the magnetic flux between the third outer magnetic pole portion and the fourth outer magnetic pole portion, which are excited by the second coil 4, alternately act on the part of the magnet 7. The outer magnetic pole portions make the magnetic fluxes act on the same part of the magnet 7. Accordingly, there can be provided the motor which is not susceptible to bad influences due to variation in magnetization, and the like, and which has stable performance.

Next, description will be made of an operation of the stepping motor in accordance with Embodiment 1 with reference to FIGS. 5 to 8.

In the motor shown in FIG. 5, the first coil 2 is energized to perform excitation such that: the first outer tooth portion 1a of the stator 1 excited to the north pole; the second outer tooth portion 1b and the third outer tooth portion 1c are excited to the south poles; and the part of the auxiliary yoke 6 which oppose the first outer tooth portion 1a is excited to the south pole. Also, the second coil 4 is energized to perform excitation such that: the fourth outer tooth portion 1f is excited to the north pole; the fifth outer tooth portion 1g and the sixth outer tooth portion 1h are excited to the south poles; and the part of the auxiliary yoke 6 which opposes the fourth outer tooth portion 1f is excited to the south pole.

In the state of FIG. 5, only the energization direction to the first coil 2 is inverted, and excitation is performed such that: the first outer tooth portion 1a is excited to a south pole; the second outer tooth portion 1b and the third outer tooth portion 1c are excited to north poles; and the part of the auxiliary yoke 6 which opposes the first outer tooth portion 1a is excited to a north pole. As a result, the magnet 7 is rotated by 30° in the counterclockwise direction, as shown in FIG. 6.

Figure 6:
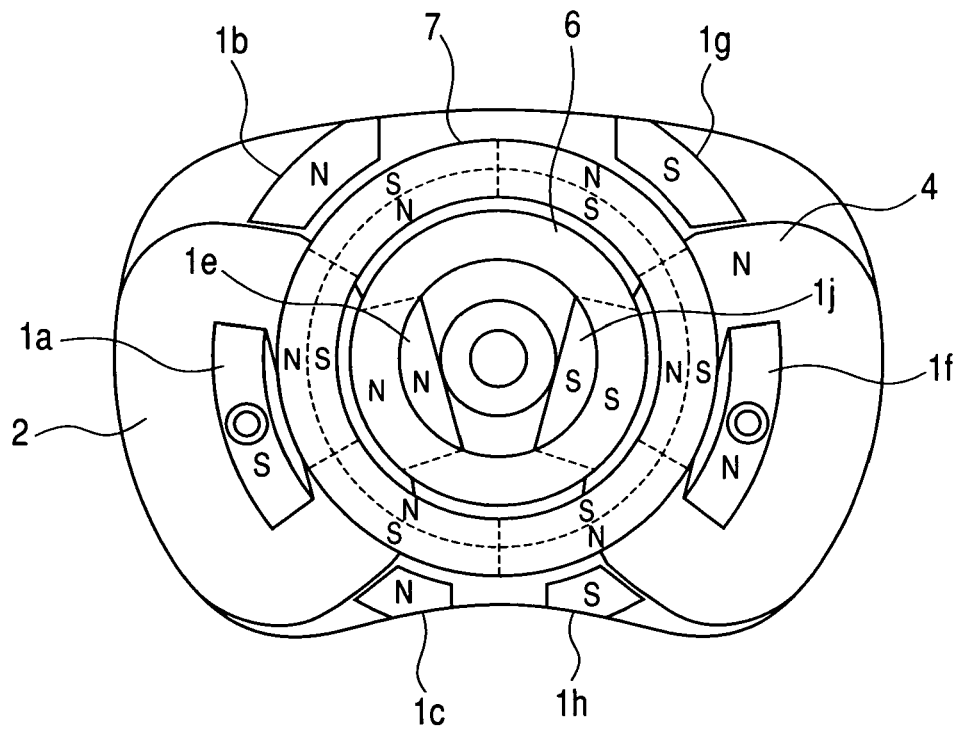
FIG. 6 is a sectional view showing the state in which the magnet has been rotated by 30° by switching coil energization from the state of FIG. 5.

In the state of FIG. 6, only the energization direction to the second coil 4 is inverted, and excitation is performed such that: the fourth outer tooth portion 1f is excited to a south pole; the fifth outer tooth portion 1g and the sixth outer tooth portion 1h are excited to north poles; and the part of the auxiliary yoke 6 which opposes the fourth outer tooth portion 1f is excited to a north pole. As a result, the magnet 7 is further rotated by 30° in the counterclockwise direction, as shown in FIG. 7.

Figure 7:
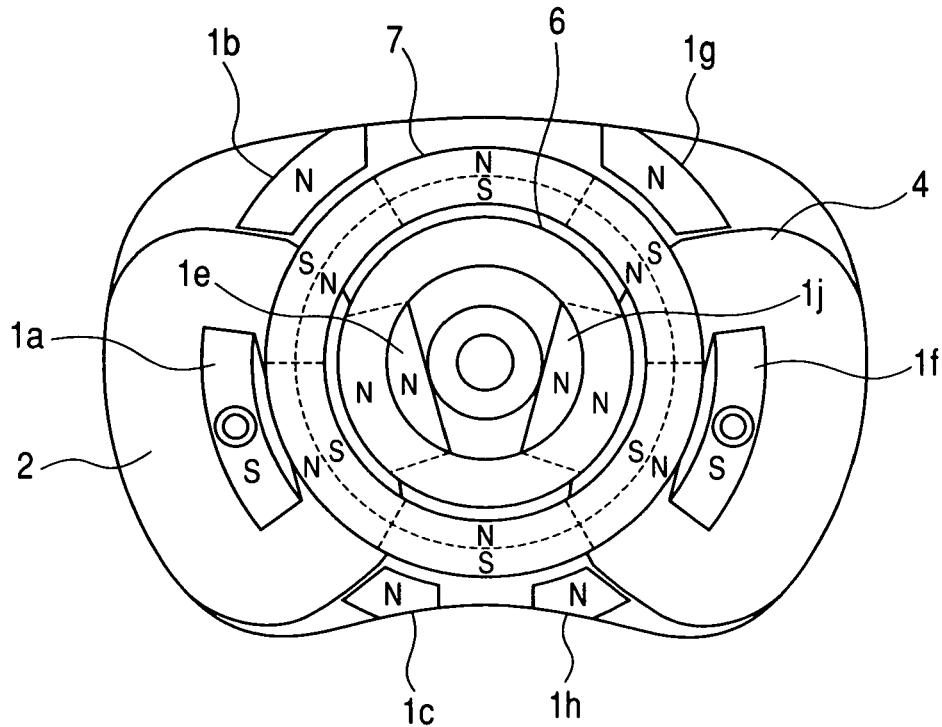
FIG. 7 is a sectional view showing the state in which the magnet has been further rotated by 30° by switching coil energization from the state of FIG. 6.
Figure 8:
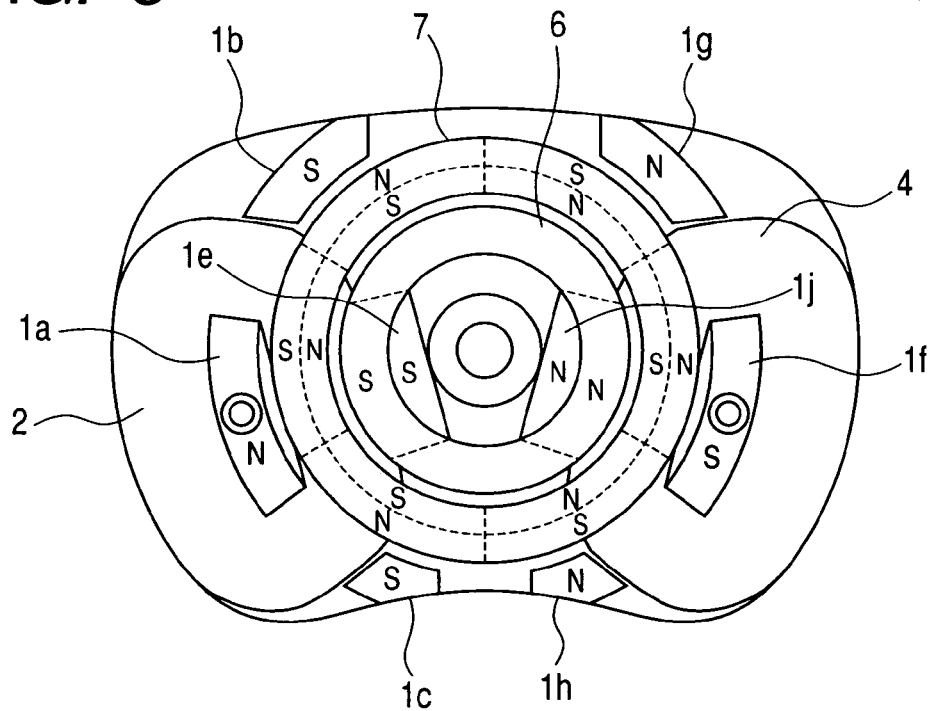
FIG. 8 is a sectional view showing the state in which the magnet has been further rotated by 30° by switching coil energization from the state of FIG. 7.

In the state of FIG. 7, only the energization direction to the first coil 2 is inverted, and excitation is performed such that: the first outer tooth portion 1a is excited to a north pole; the second outer tooth portion 1b and the third outer tooth portion 1c are excited to south poles; and the part of the auxiliary yoke 6 which opposes the first outer tooth portion 1a is excited to a south pole. As a result, the magnet 7 is further rotated by 30° in the counterclockwise direction, as shown in FIG. 8.

Thereafter, the energization directions to the first coil 2 and the second coil 4 are sequentially switched. Thus, switching of excitation is performed at different timings with respect to the first outer magnetic pole portion and second outer magnetic pole portion and the third outer magnetic pole portion and fourth outer magnetic pole portion, as a result of which the magnet 7 is rotated to the position corresponding to the energization phase.

In Embodiment 1, the magnet 7 is rotated by switching the energization states in an order of first energization state, second energization state, third energization state, and the fourth energization state (2 phase excitation drive), where the first energization state is defined as forward-direction energization to the first coil 2 and forward-direction energization to the second coil 4; the second energization state is defined as inverse-direction energization to the first coil 2 and forward-direction energization to the second coil 4; the third energization state is defined as inverse-direction energization to the first coil 2 and inverse-direction energization to the second coil 4; and the fourth energization state is defined as forward-direction energization to the first coil 2 and inverse-direction energization to the second coil 4. However, it may be adopted to rotate the magnet 7 by switching the energization states in an order of fifth energization state, sixth energization state, seventh energization state, and eighth energization state (1-2 phase excitation drive), where the fifth energization state is defined as forward-direction energization to the first coil 2 and non-energization to the second coil 4; the sixth energization state is defined as non-energization to the first coil 2 and forward-direction energization to the second coil 4; the seventh energization state is defined as inverse-direction energization to the first coil 2 and non-energization to the second coil 4; and the eighth energization state is defined as non-energization to the first coil 2 and inverse-direction energization to the second coil 4. This also rotates the magnet 7 to the rotation position corresponding to the energization phase.

Next, description will be made of the phase relationship between the magnet 7 and the first outer tooth portion 1a as the first outer magnetic pole portion, the second outer tooth portion 1b and third outer tooth portion 1c which form the second outer magnetic pole portion the fourth outer tooth portion 1f as the third outer magnetic pole portion, or the fifth outer tooth portion 1g and sixth outer tooth portion 1h which form the fourth outer magnetic pole portion.

When the energization state is switched from the first energization state through the second energization state and the third energization state to the fourth energization state as described above, switching of the polarities to be magnetized is performed alternately to the first outer magnetic pole portion and second outer magnetic pole portion and to the third outer magnetic pole portion and fourth outer magnetic pole portion. As shown in FIG. 5, forward energization is conducted to the first coil 2, thereby exciting the first outer magnetic pole portion to the north pole and exciting the second outer magnetic pole portion to the south pole. Then, a rotational force in the clockwise direction in the figure is generated in the magnet 7 so that the center of the first outer tooth portion 1a conforms to the center of the magnetized portion (the center of the south pole) of the magnet 7. At the same time, forward energization is conducted also to the second coil 4, thereby exciting the third outer magnetic pole portion to the north pole and exciting the fourth outer magnetic pole portion to the south pole. Then, a rotational force in the counterclockwise direction in the figure is generated in the magnet 7 so that the center of the fourth outer tooth portion 1f conforms to the center of the magnetized portion (the center of the south pole) of the magnet 7. Thus, the magnet 7 rests in the state in which the rotational forces are balanced during the energization to both the coils. This is shown in the state in FIG. 5. When the energization amounts to both the coils are equal to each other, both the phase difference between the center of the first outer tooth portion 1a and the center of the magnetized portion (the center of the south pole) of the magnet 7 and the phase difference between the center of the fourth outer tooth portion 1f and the center of the magnetized portion (the center of the south pole) of the magnet 7 are approximately 15°. At this point, the second outer tooth portion 1b excited to the south pole is opposed to the north pole of the magnet 7, the third outer tooth portion 1c excited to the south pole is also opposed to the north pole of the magnet 7, the fifth outer tooth portion 1g excited to the south pole is opposed to the north pole of the magnet 7, and the sixth outer tooth portion 1h excited to the south pole is also opposed to the north pole of the magnet 7.

The first coil 2 is switched to inverse energization from the state in FIG. 5, whereby the first outer magnetic pole portion is excited to the south pole, and the second outer magnetic pole portion is excited to the north pole. Then, a rotational force in the counterclockwise direction in the figure is generated in the magnet 7 so that the center of the first outer tooth portion 1a conforms to the center of the magnetized portion (the center of the north pole) of the magnet 7. At the same time, a rotational force in the counterclockwise direction in the figure is generated so that the second outer tooth portion 1b is opposed to the south pole of the magnet 7, and also, a rotational force in the counterclockwise direction in the figure is generated so that the third outer tooth portion 1c is opposed to the south pole of the magnet 7. Here, the second coil 4 is kept being forward-energized. Thus, a rotational force in the counterclockwise direction in the figure is generated in the magnet 7 so that the center of the fourth outer tooth portion 1f conforms to the center of the magnetized portion (the center of the south pole) of the magnet 7. As a result, the magnet 7 starts to be rotated in the counterclockwise direction from the state in FIG. 5.

After the magnet is rotated by approximately 15° in the counterclockwise direction from the state in FIG. 5, the center of the fourth outer tooth portion 1f conforms to the center of the magnetized portion (the center of the south pole) of the magnet 7. The fifth outer tooth portion 1g and the sixth outer tooth portion 1h are still opposed to the north poles of the magnet 7. At this point, the center of the first outer tooth portion 1a conforms to the boundary of the magnetized portion (boundary between the south pole and the north pole) of the magnet 7. In this state, there is further generated the rotational force in the counterclockwise direction. Then, when the magnet is further rotated by approximately 15° in the counterclockwise direction from the state (rotated by approximately 30° in the counterclockwise direction from the state in FIG. 5), the rotational forces of both the coils are balanced. The magnet rests at the position. This is the state shown in FIG. 6. At this time, the second outer tooth portion 1b and third outer tooth portion 1c which are excited to the north poles are opposed to the south poles of the magnet 7, and the fifth outer tooth portion 1g and sixth outer tooth portion 1h which are excited to the south poles are opposed to the north poles of the magnet 7.

The second coil 4 is switched to inverse energization from the state in FIG. 6, whereby the third outer magnetic pole portion is excited to the south pole, and the fourth outer magnetic pole portion is excited to the north pole. Then, a rotational force in the counterclockwise direction in the figure is generated in the magnet 7 so that the center of the fourth outer tooth portion 1f conforms to the center of the magnetized portion (the center of the north pole) of the magnet 7. At the same time, a rotational force in the counterclockwise direction in the figure is generated so that the fifth outer tooth portion 1g is opposed to the south pole of the magnet 7, and also, a rotational force in the counterclockwise direction in the figure is generated so that the sixth outer tooth portion 1h is opposed to the south pole of the magnet 7. Here, the first coil 2 is kept being inverse energized. Thus, a rotational force in the counterclockwise direction in the figure is generated in the magnet 7 so that the center of the first outer tooth portion 1a conforms to the center of the magnetized portion (the center of the north pole) of the magnet 7. As a result, the magnet 7 starts to be rotated in the counterclockwise direction from the state in FIG. 6.

After the magnet is rotated by approximately 15° in the counterclockwise direction from the state in FIG. 6, the center of the first outer tooth portion 1a conforms to the center of the magnetized portion (the center of the north pole) of the magnet 7. The second outer tooth portion 1b and the third outer tooth portion 1c are still opposed to the south poles of the magnet 7. At this point, the center of the fourth outer tooth portion 1f conforms to the boundary of the magnetized portion (boundary between the south pole and the north pole) of the magnet 7. In this state, there is further generated the rotational force in the counterclockwise direction. Then, when the magnet is further rotated by approximately 15° in the counterclockwise direction from the state (rotated by approximately 30° in the counterclockwise direction from the state in FIG. 6), the rotational forces of both the coils are balanced. The magnet rests at the position. This is the state shown in FIG. 7. At this time, the second outer tooth portion 1b and third outer tooth portion 1c which are excited to the north poles are opposed to the south poles of the magnet 7, and the fifth outer tooth portion 1g and sixth outer tooth portion 1h which are excited to the north poles are opposed to the south poles of the magnet 7.

The first coil 2 is switched to forward energization from the state in FIG. 7, whereby the first outer magnetic pole portion is excited to the north pole, and the second outer magnetic pole portion is excited to the south pole. Then, a rotational force in the counterclockwise direction in the figure is generated in the magnet 7 so that the center of the first outer tooth portion 1a conforms to the center of the magnetized portion (the center of the south pole) of the magnet 7. At the same time, a rotational force in the counterclockwise direction in the figure is generated so that the second outer tooth portion 1b is opposed to the north pole of the magnet 7, and also, a rotational force in the counterclockwise direction in the figure is generated so that the third outer tooth portion 1c is opposed to the north pole of the magnet 7. Here, the second coil 4 is kept being inverse-energized. Thus, a rotational force in the counterclockwise direction in the figure is generated in the magnet 7 so that the center of the fourth outer tooth portion 1f conforms to the center of the magnetized portion (the center of the north pole) of the magnet 7. As a result, the magnet 7 starts to be rotated in the counterclockwise direction from the state in FIG. 7.

After the magnet 7 is rotated by approximately 15° in the counterclockwise direction from the state in FIG. 7, the center of the fourth outer tooth portion 1f conforms to the center of the magnetized portion (the center of the north pole) of the magnet 7. The fifth outer tooth portion 1g and the sixth outer tooth portion 1h are still opposed to the south poles of the magnet 7. At this point, the center of the first outer tooth portion 1a conforms to the boundary of the magnetized portion (boundary between the south pole and the north pole) of the magnet 7. In this state, there is further generated the rotational force in the counterclockwise direction. Then, when the magnet is further rotated by approximately 15° in the counterclockwise direction from the state (rotated by approximately 30° in the counterclockwise direction from the state in FIG. 7), the rotational forces of both the coils are balanced. The magnet rests at the position. This is shown in the state in FIG. 8. At this time, the second outer tooth portion 1b and third outer tooth portion 1c which are excited to the south poles are opposed to the north poles of the magnet 7, and the fifth outer tooth portion 1g and sixth outer tooth portion 1h which are excited to the north poles are opposed to the south poles of the magnet 7.

As described above, in accordance with Embodiment 1, the magnetic flux generated by the first coil 2 crosses the magnet 7 between the first outer magnetic pole portion and the first inner magnetic pole portion, and the magnetic flux generated by the second coil 4 crosses the magnet 7 between the third outer magnetic pole portion and the second inner magnetic pole portion. Thus, the magnetic fluxes can be made to effectively act on the magnet 7. As a result, the motor output can be improved. Further, the magnetic flux generated by the first coil 2 also acts on the second outer magnetic pole portion, and the magnetic flux generated by the second coil 4 also acts on the fourth outer magnetic pole portion, which leads to a further improvement of the motor output. In addition, the outer magnetic poles, which oppose the outer circumference of the magnet, can be increased in number without increasing the outer diameter of the motor. Therefore, the rotation balance is improved, which leads to an improved silencing effect.

Further, the first outer tooth portion 1*a* as the first outer magnetic pole portion and the fourth outer tooth portion 1*f* as the third outer magnetic pole portion each are formed of a comb-tooth portion that extends in a direction parallel to the rotary shaft 8. Thus, the dimension in a direction perpendicular to the motor shaft can be suppressed to the minimum. Also, a structure can be realized in which the assembly of the first coil 2 and second coil 4 is simply performed.

Further, the first outer tooth portion 1*a* as the first outer magnetic pole portion and the second outer tooth portion 1*b* and third outer tooth portion 1*c*, which form the second outer magnetic pole portion, and the fourth outer tooth portion 1*f* as the third outer magnetic pole portion and the fifth outer tooth portion 1*g* and sixth outer tooth portion 1*h*, which form the fourth outer magnetic pole portion, are structured to be opposed to the same magnet 7 in the respective different angle ranges. Therefore, the magnet 7 can be structured to be short in the axial direction, which enables the short motor from the viewpoint of the length in the direction parallel to the axial direction.

Specifically, there is provided a structure in which the magnetic flux generated in the magnetic circuit, which is constituted by the first coil 2, the first outer magnetic pole portion and second outer magnetic pole portion, and the first inner magnetic pole portion, and the magnetic flux generated in the magnetic circuit, which is constituted by the second coil 4, the third outer magnetic pole portion and fourth outer magnetic pole portion, and the second inner magnetic pole portion, act on the same magnet portion. Due to the rotation of the magnet 7, the respective magnetic circuits act on the same circumference of the magnet 7, and use the same part of the magnet 7. Since the same part of the magnet 7 is used, there can be provided the motor which is not susceptible to bad influences due to variation in magnetization, and the like, and which has stable performance.

Further, when the first outer magnetic pole portion, second outer magnetic pole portion, third outer magnetic pole portion, and fourth outer magnetic pole portion are formed by using the same member, an error in mutual positions can be suppressed low. Also, there can be provided a motor which requires the smaller number of components and of which structure is simple, which leads to reduction in costs.

Moreover, when the number of magnetized poles on the outer circumferential surface of the magnet 7 is set to north pole, the first outer tooth portion 1*a* is formed to be shifted from the fourth outer tooth portion 1*f* by (180/n) degree in phase. Thus, the magnet 7 can be rotated to the position in correspondence with the energization state by sequentially switching the energization directions to the first coil 2 and the second coil 4 at the different timings. Accordingly, the motor can be made to function as a stepping motor which enables bidirectional rotation.

Figure 9:
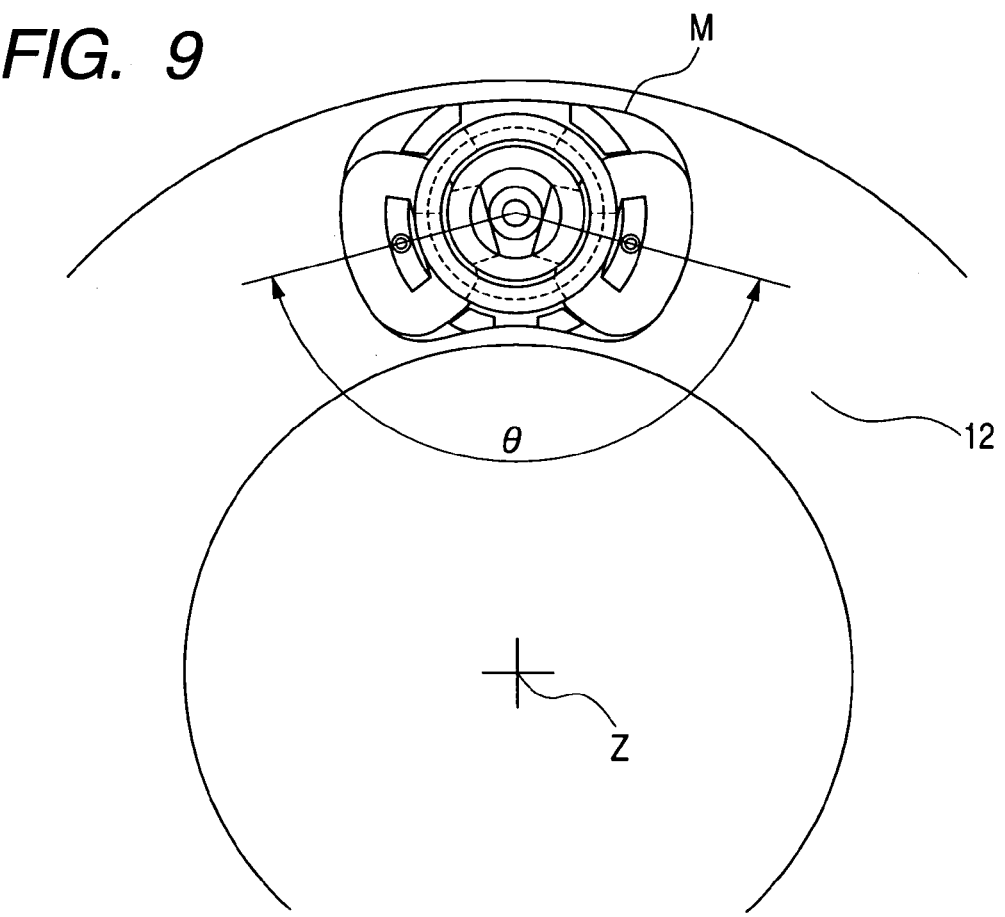
FIG. 9 is a view showing the state in which the motor of FIG. 1 is arranged in a lens barrel base plate.

FIG. 9 is a plan view in the case where the motor M in Embodiment 1 is disposed in a lens barrel base plate.

Figure 22:
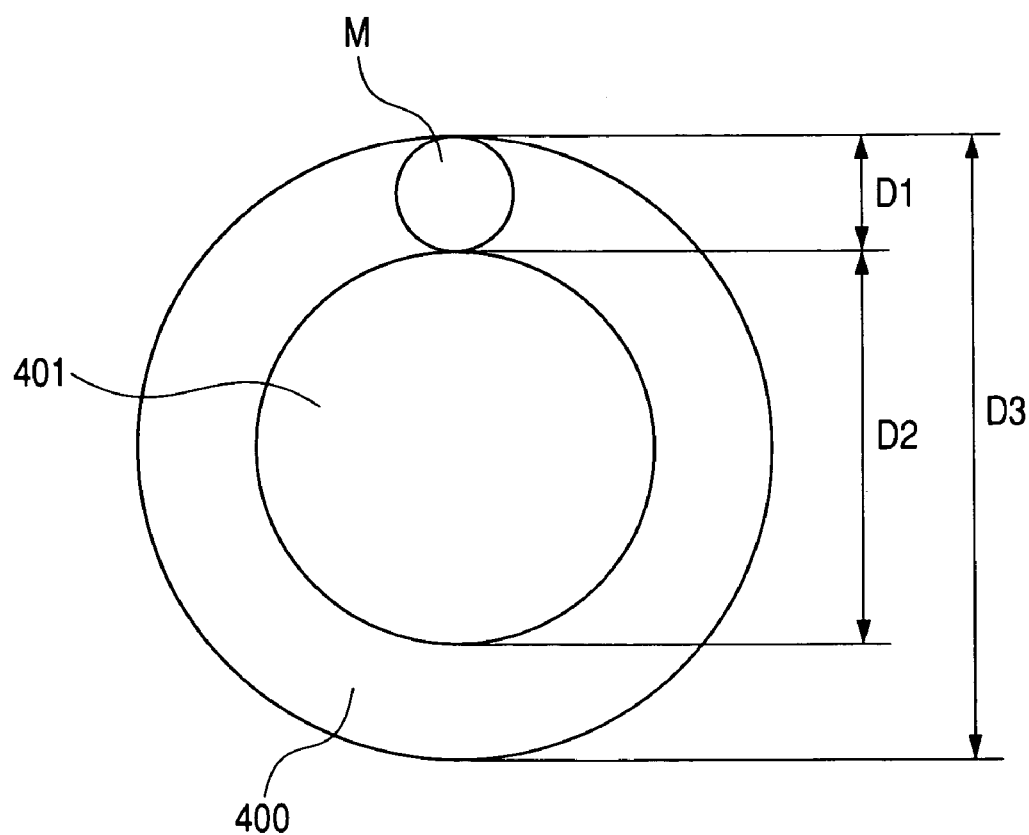
FIG. 22 is an explanatory view showing the size of a cross section of a lens barrel base plate or light amount adjusting device in the case of using the cylindrical stepping motor shown in FIG. 17.

In the case where the motor M is disposed in a cylindrical lens barrel base plate 12, the rotary shaft of the motor M is arranged to be parallel to an optical axis Z. Also, arrangement is provided such that the angle θ, which is formed by the first outer magnetic pole portion (first outer tooth portion 1*a*) and the second outer magnetic pole portion (fourth outer tooth portion 1*f*) with the rotary shaft center of the rotor taken as the vertex, is on the optical axis Z side with respect to the rotary shaft center of the rotor, as shown in FIG. 9. Further, at this point, the first outer tooth portion 1*a* and the fourth outer tooth portion 1*f* are arranged to have the equal distance from the optical axis Z. Based on the above arrangement, the motor M is arranged along the cylindrical shape of the lens barrel base plate 12. Thus, the dimension of D3 in FIG. 22 can be made small to enable an extremely compact lens barrel base plate, and also, a protrusion in the optical axis direction is small.

Figure 10:
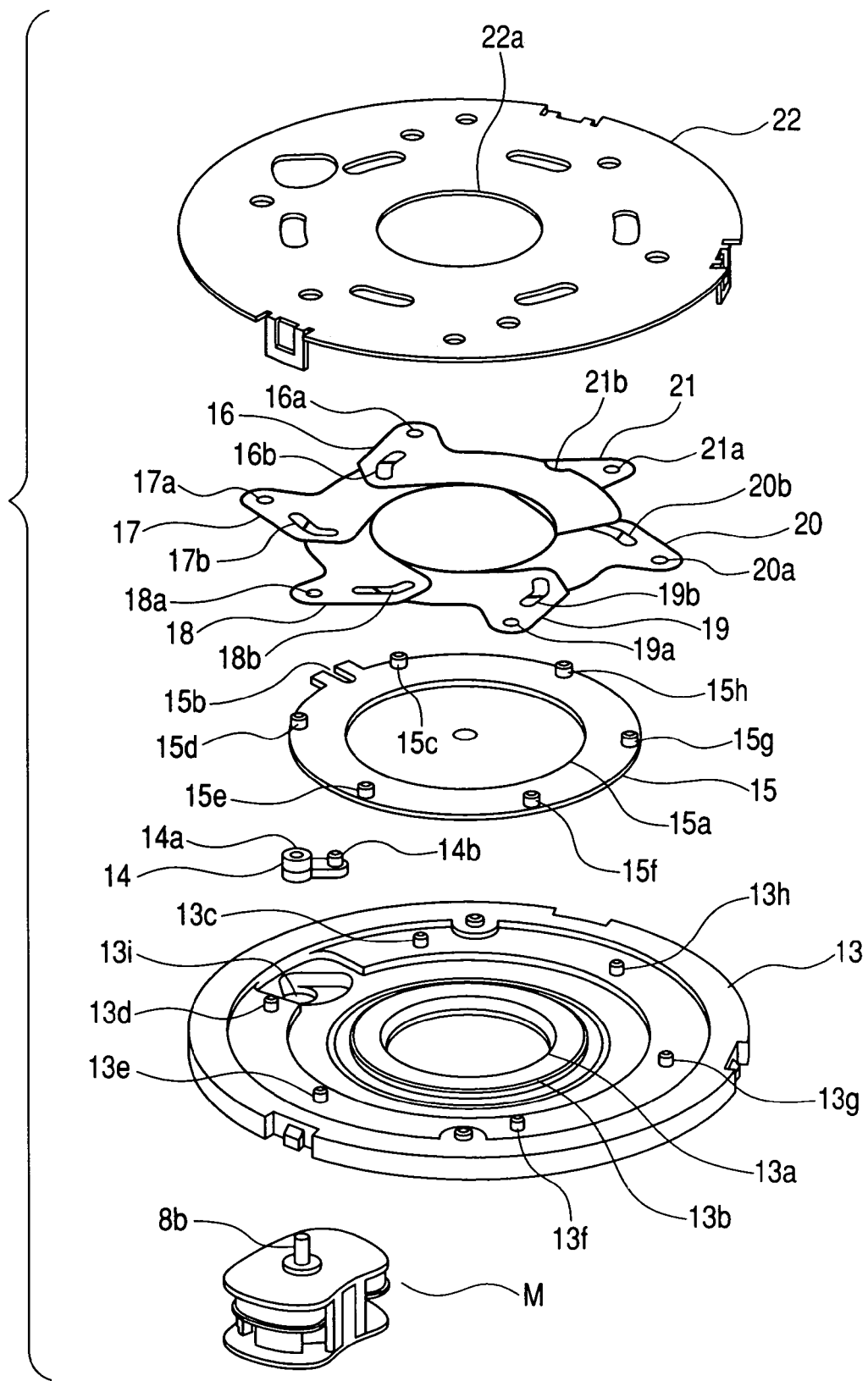
FIG. 10 is an exploded perspective view of a light amount adjusting device using the motor of FIG. 1.

FIG. 10 is an exploded perspective view of an opening amount adjusting device. The motor M in Embodiment 1 is used for driving an opening amount adjusting member.

Reference numeral 13 denotes a ring-shape base plate formed with an opening portion 13*a* in its center. Reference numeral 14 denotes a driving lever, of which hole portion 14*a* is fitted to the output shaft portion 8*b* of the motor M in Embodiment 1, whereby the lever is fixed by press fitting, adhesion, or the like. Reference numeral 15 denotes a drive transmitting ring, of which opening portion 15*a* is fitted to a fitting portion 13*b* of the base plate 13, whereby the ring is rotatably attached to the base plate 13. The motor M is fixed onto the base plate 13 by a known method (for example, adhesion or machine-screw stop). At this time, the bearing 11 is fitted into an attaching hole portion 13*i*, whereby the motor M is positioned. Further, the driving lever 14 is fixed to the motor M while the base plate 13 is sandwiched therebetween. A protrusion 14*b* provided in the driving lever 14 is fitted to an U-groove portion 15*b* in the drive transmitting ring 15, and thus, the driving lever 14 is driven in association with the ring 15.

Reference numerals 16, 17, 18, 19, 20, and 21 denote diaphragm blades, which serve as the opening amount adjusting member and which are respectively provided with shaft holes 16*a*, 17*a*, 18*a*, 19*a*, 20*a*, and 21*a*. Those shaft holes are rotatably fitted to respective projections 13*c*, 13*d*, 13*e*, 13*f*, 13*g*, and 13*h* formed in the base plate 13. Further, the diaphragm blades 16 to 21 are formed with cam grooves 16*b*, 17*b*, 18*b*, 19*b*, 20*b*, and 21*b*, respectively. Those cam grooves are slidably fitted to respective projections 15*c*, 15*d*, 15*e*, 15*f*, 15*g*, and 15*h* formed in the drive transmitting ring 15. Reference numeral 22 denotes a blade pressing plate provided with an opening portion 22*a* in its center. The blade pressing plate 22 is fixed to the base plate 13 while the diaphragm blades 16 to 21 and the drive transmitting ring 15 are sandwiched therebetween, and has a function of rotatably holding the diaphragm blades 16 to 21 and the drive transmitting ring 15 and preventing them from slipping in the optical axis direction.

When the motor M is rotated, the driving lever 14 which is fixed to the rotary shaft 8 is integrally rotated. The drive transmitting ring 15 is also rotated in association with this. As a result, the diaphragm blades 16 to 21 are rotated about the shaft holes 16*a* to 21*a*, respectively. Thus, amount of the passing light at the opening portion 13*a* of the base plate 13 varies.

Also in the opening amount adjusting device in FIG. 10, the rotary shaft of the motor M is arranged to be parallel to the optical axis, and in addition, the opening amount adjusting device is arranged such that the angle θ, which is formed by the first outer magnetic pole portion (first outer tooth portion 1a) and the second outer magnetic pole portion (fourth outer tooth portion 1f) with the rotation center of the rotor taken as the vertex, is on the optical axis Z side with respect to the rotation center of the rotor, as shown in FIG. 9. This arrangement can make the dimension of D3 in FIG. 22 smaller. Thus, there can be provided the extremely compact opening amount adjusting device without increasing the outer diameter. Also, the motor M is short in length in the direction of the rotary shaft. Therefore, there can be provided the opening amount adjusting device which does not obstruct other lens and structure and which has a small protrusion in the optical axis direction.

In Embodiment 1, the motor M is used as an actuator for driving the diaphragm blades, but can be used for other applications, for example, rotating a cam cylinder or the like for lens drive. Accordingly, the motor is useful as a driving device having advantages of high output, small diameter, and short length in an axial direction.

Embodiment 2

Figure 11:
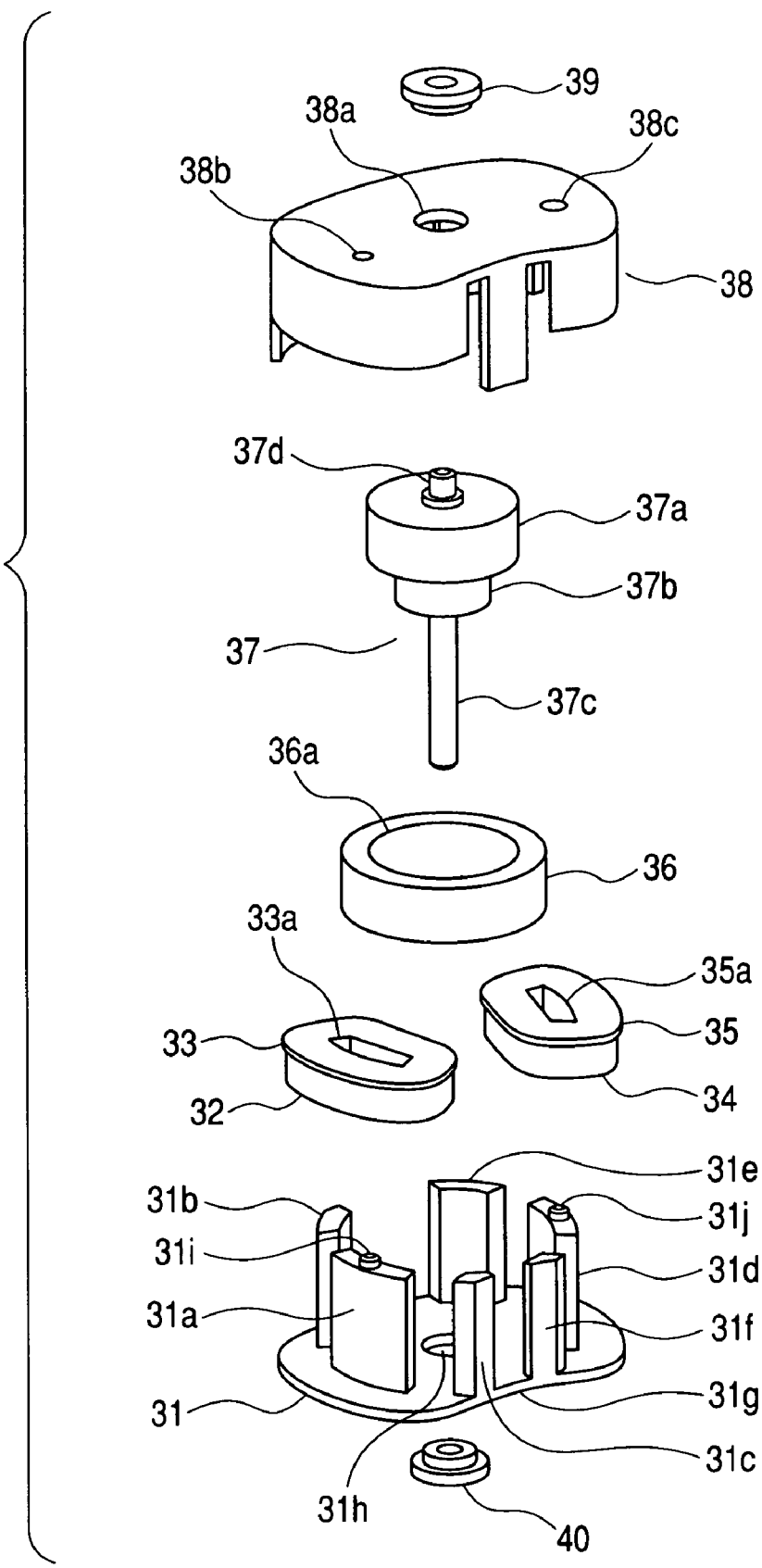
FIG. 11 is an exploded perspective view of a motor in accordance with Embodiment 2 of the present invention.
Figure 12:
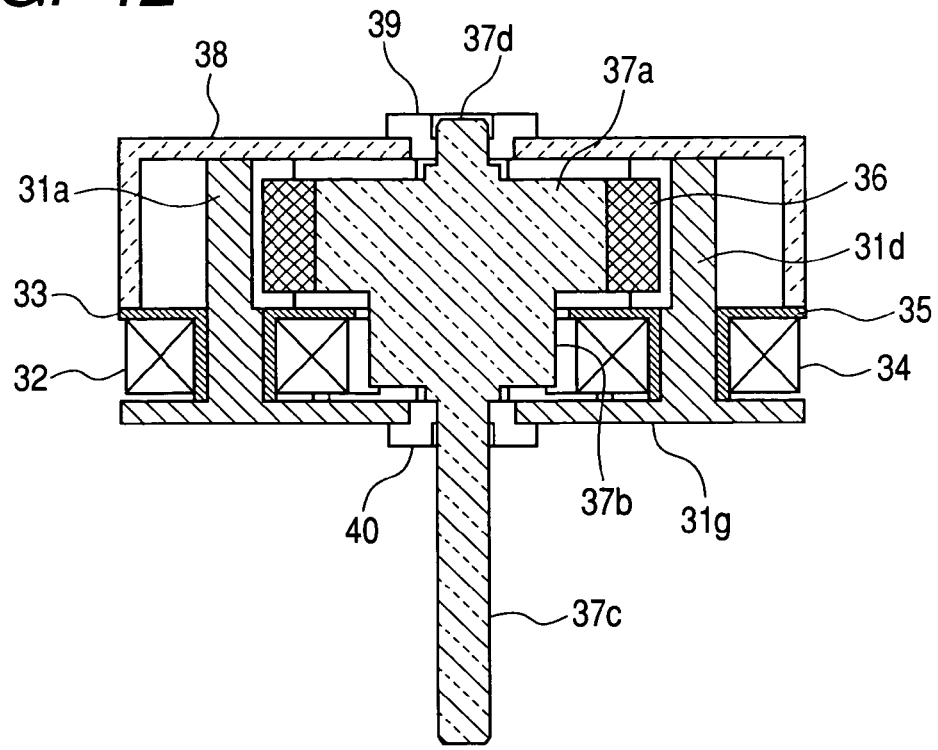
FIG. 12 is a sectional view taken along a plane in parallel to an axial direction, the plane passing through coils and a rotor shaft of the motor of FIG. 11.

FIGS. 11 to 16 are views in accordance with Embodiment 2 of the present invention. FIG. 11 is an exploded perspective view of a motor, and FIG. 12 is a sectional view of a surface parallel to an axial direction, which is taken along coils and a rotor shaft of the motor in FIG. 11.

In FIGS. 11 and 12, reference numeral 31 denotes a stator composed of a soft magnetic material, and the stator has a first outer tooth portion 31a, a second outer tooth portion 31b, and a third outer tooth portion 31c. The first outer tooth portion 31a forms a first outer magnetic pole portion, and the second outer tooth portion 31b and the third outer tooth portion 31c form a second outer magnetic pole portion. Symbol 31d denotes a fourth outer tooth portion; 31e, a fifth outer tooth portion; and 31f, a sixth outer tooth portion. The fourth outer tooth portion 31d forms a third outer magnetic pole portion, and the fifth outer tooth portion 31e and the sixth outer tooth portion 31f form a fourth outer magnetic pole portion. Symbol 31g denotes a flat plate portion, which is connected with each of ends of the first outer tooth portion 31a, second outer tooth portion 31b, third outer tooth portion 31c, fourth outer tooth portion 31d, fifth outer tooth portion 31e, and sixth outer tooth portion 31f. Symbol 31h denotes a bearing attaching portion attached with a bearing 40 described later.

The first outer tooth portion 31a, second outer tooth portion 31b, third outer tooth portion 31c, fourth outer tooth portion 31d, fifth outer tooth portion 31e, and sixth outer tooth portion 31f each are configured in a comb-tooth shape that extends in a direction parallel to a rotor shaft 37 described later.

The stator 31 in Embodiment 2 is different from the above-mentioned stator described in Japanese Patent Application Laid-Open No. H09-331666 (U.S. Pat. No. 5,831,356). The first outer magnetic pole portion, second outer magnetic pole portion, third outer magnetic pole portion, and fourth outer magnetic pole portion are structured integrally. Thus, the mutual error is reduced among the first outer magnetic pole portion, second outer magnetic pole portion, third outer magnetic pole portion, and fourth outer magnetic pole portion. As a result, variation in performance of the motor due to assembly can be suppressed to the minimum.

Reference numeral 32 denotes a first coil, and reference numeral 33 denotes a first bobbin wound around the first coil 32. In the state of being fixed to the first bobbin 33, the first coil 32 is fixed such that the first outer tooth portion 31a of the stator 31 is arranged to the inner circumference. In this state, the second outer tooth portion 31b and the third outer tooth portion 31c are adjacent to an outer circumference of the first coil 32. Through energization to the first coil 32, the first outer tooth portion 31a, second outer tooth portion 31b, and third outer tooth portion 31c are excited. At this point, the first outer tooth portion 31a is excited to a magnetic pole different from that to which the second outer tooth portion 31b and third outer tooth portion 31c are excited. That is, the first outer magnetic pole portion and the second outer magnetic pole portion are respectively excited to the different poles.

Reference numeral 34 denotes a second coil, and reference numeral 35 denotes a second bobbin wound around the second coil 34. In the state of being fixed to the second bobbin 35, the second coil 34 is fixed such that the fourth outer tooth portion 31d of the stator 31 is arranged to the inner circumference. In this state, the fifth outer tooth portion 31e and the sixth outer tooth portion 31f are adjacent to an outer circumference of the first coil 34. Through energization to the second coil 34, the fourth outer tooth portion 31d, fifth outer tooth portion 31e, and sixth outer tooth portion 31f are excited. At this point, the fourth outer tooth portion 31d is excited to a magnetic pole different from that to which the fifth outer tooth portion 31e and sixth outer tooth portion 31f are excited. That is, the third outer magnetic pole portion and the fourth outer magnetic pole portion are respectively excited to the different poles.

The first coil 32 and the second coil 34 are arranged to be adjacent to each other on the plane of a flat plate portion 31g of the stator 31. Therefore, the motor can be configured shortened in its axial direction.

Reference numeral 36 denotes a cylindrical magnet composed of a permanent magnet. Reference numeral 37 denotes the rotary shaft composed of a soft magnetic material, and an outer circumferential surface of a first columnar portion 37a of the rotor shaft 37 and an inner circumferential surface 36a of the magnet 36 adhere to be fixed to each other by adhesion, press fitting, or the like. At this time, fixing is performed such that an upper surface of the magnet 36 and an upper surface of the first columnar portion 37a form the same surface (refer to FIG. 12). The rotor shaft 37 is provided with an output shaft portion 37c and a holding shaft portion 37d, which are rotatably held by the bearings 40 and 39 described later, respectively. At this time, a second columnar portion 37b of the rotor shaft 37 is arranged adjacently between the first coil 32 and the second coil 34. As to the magnet 36, its outer circumferential surface is divided into multiple portions in a circumferential direction; that is, the portions are alternately magnetized to south poles and north poles with the number of magnetized poles being n (in Embodiment 2, 6 divisions, that is, n=6). The magnet 36 is composed of a plastic magnet material formed by injection molding or the like. Thus, a radial thickness of the cylindrical shape can be reduced extremely. The inner circumferential surface of the magnet 36 may have magnetization distribution weaker than that in the outer circumferential surface, or may not be magnetized at all. Alternatively, the inner circumferential surface may be magnetized to an opposite magnetic pole with respect to the outer circumferential surface; that is, in the case where a part of the outer circumferential surface is magnetized to the south pole, a part of the inner circumferential surface corresponding to the part is magnetized to the north pole.

The first outer tooth portion 31a, second outer tooth portion 31b, third outer tooth portion 31c, fourth outer tooth portion 31d, fifth outer tooth portion 31e, and sixth outer tooth portion 31f are disposed to face to the outer circumferential surface of the magnet 36 with a predetermined gap.

The part of the first columnar portion 37a which faces the first outer magnetic pole portion 31a, and the part of the second columnar portion 37b which is adjacent to the outer circumference of the first coil 32, form a first inner magnetic pole portion. Similarly, the part of the first columnar portion 37a which faces the third outer magnetic pole portion 31d, and the part of the second columnar portion 37b which is adjacent to the outer circumference of the second coil 34, form a second inner magnetic pole portion.

The first outer magnetic pole portion (first outer tooth portion 31a) and the first inner magnetic pole portion (the part of the first columnar portion 37a, which faces the first outer magnetic pole portion 31a, and the part of the second columnar portion 37b which is adjacent to the outer circumference of the first coil 32) are excited by performing energization to the first coil 32. A magnetic flux across the magnet 36 is generated between the magnetic poles, and effectively acts on the magnet 36. At this point, the first outer magnetic pole portion and the first inner magnetic pole portion are excited to the opposite magnetic poles. Similarly, the third outer magnetic pole portion (fourth outer tooth portion 31d) and the second inner magnetic pole portion (the part of the first columnar portion 37a, which faces the third outer magnetic pole portion 31d, and the part of the second columnar portion 37b, which is adjacent to the outer circumference of the second coil 34) are excited by performing energization to the second coil 34. A magnetic flux across the magnet 36 is generated between the magnetic poles, and effectively acts on the magnet 36. At this time, the second outer magnetic pole portion and the second inner magnetic pole portion are excited to the opposite magnetic poles.

Further, the magnet 36 is composed of the cylindrical plastic magnet material formed by injection molding or the like, as described above. Thus, the radial thickness of the cylindrical shape can be reduced extremely. Also, the first columnar portion 37a, which forms the inner magnetic pole portion while opposes the inner circumferential surface of the magnet 36, does not need to be provided with a gap with respect to the inner circumferential surface of the magnet 36. Therefore, the distance between the first outer tooth portion 31a and the first columnar portion 37a and the distance between the fourth outer tooth portion 31d and the first columnar portion 37a can be reduced extremely. As a result, magnetic resistances of a magnetic circuit, which is constituted by the first coil 32, first outer magnetic pole portion, and first inner magnetic pole portion, and a magnetic circuit, which is constituted by the second coil 34, second outer magnetic pole portion, and second inner magnetic pole portion, can be made small. Accordingly, the output of the motor can be increased.

Further, the second outer magnetic pole portion (second outer tooth portion 31b and third outer tooth portion 31c) is also excited by performing energization to the first coil 32. A magnetic flux is generated also between the magnetic poles: the first outer magnetic pole portion and the second outer magnetic pole portion, and the second outer magnetic pole portion acts on the magnet 36 to which the portion is opposed. Similarly, the fourth outer magnetic pole portion (fifth outer tooth portion 31e and sixth outer tooth portion 31f) is also excited by performing energization to the second coil 34. A magnetic flux is generated also between the magnetic poles: the third outer magnetic pole portion and the fourth outer magnetic pole portion, and the fourth outer magnetic pole portion acts on the magnet 36 to which the portion is opposed. That is, the magnetic flux generated between the magnetic poles: the first outer magnetic pole portion and the first inner magnetic pole portion, crosses and effectively acts on the magnet 36, and the magnetic flux generated between the magnetic poles: the first outer magnetic pole portion and the second outer magnetic pole portion, adjoins and acts on the magnet 36 in an auxiliary manner. Similarly, the magnetic flux generated between the magnetic poles: the third outer magnetic pole portion and the second inner magnetic pole portion, crosses and effectively acts on the magnet 36, and the magnetic flux generated between the magnetic poles: the third outer magnetic pole portion and the fourth outer magnetic pole portion, adjoins and acts on the magnet 36 in an auxiliary manner. Therefore, a large amount of magnetic flux can be generated with a small current, which can attain the increase of the motor output, lower power consumption, and downsizing of the coil.

Further, an inner diameter portion of the magnet 36 is filled with the rotor shaft 37. Thus, the mechanical strength of the magnet is greater than that in the motor proposed in Japanese Patent Application Laid-Open No. H09-331666 (U.S. Pat. No. 5,831,356).

Moreover, in the motor proposed in Japanese Patent Application Laid-Open No. H09-331666 (U.S. Pat. No. 5,831,356), assembly needs to be performed while the gap between the outer diameter portion of the magnet and the outer magnetic pole portion is kept with high precision. In addition, the inner magnetic pole portion, which is located to oppose the inner diameter portion of the magnet, needs to be disposed with a predetermined gap with respect to the magnet. The gaps cannot be secured in the case where there is the variation in component precision and the low assembly precision, which leads to high possibility that there occurs a failure such as the inner magnetic pole portion contacting with the magnet. However, in Embodiment 2 of this invention, it is only needed that the gap of the outer diameter portion of the magnet 36 is managed, which enables easy assembly. Further, in the conventional example, the inner magnetic pole portion needs to be arranged so as not to contact with the part that connects the magnet with the output shaft, and thus, the length in the axial direction, in which the inner magnetic pole portion opposes the magnet, cannot be made long sufficiently. On the contrary, in Embodiment 2, the output shaft serves also as the inner magnetic pole portion. Thus, the length in the axial direction in which the inner magnetic pole portion opposes the magnet 36 can be secured long sufficiently. Accordingly, the first outer magnetic pole portion, second outer magnetic pole portion, third outer magnetic pole portion, fourth outer magnetic pole portion, and magnet 36 can be utilized effectively, which leads to the increase of the motor output.

Further, the first outer tooth portion 31a and the fourth outer tooth portion 31d each are composed of a comb tooth that extends in a direction parallel to the motor shaft, and thus, the maximum outer diameter (L1 in FIG. 13) of the motor can be suppressed to the minimum. For example, when the outer magnetic pole is composed of a yoke plate that extends in a radial direction of the magnet, the magnet needs to have a planar development, and also, is to be wound with the coil in the radial direction. As a result, the maximum outer diameter of the motor becomes large even if the length in the axial direction is short. The maximum outer diameter L1 of the motor in Embodiment 2 is determined by the thicknesses of the magnet 36, first outer tooth portion 31a, and fourth outer tooth portion 31d and the winding widths of the first coil 32 and second coil 34. Further, the first outer tooth portion 31a and the fourth outer tooth portion 31d each are composed of the comb tooth extending in the direction parallel to the motor shaft. Therefore, all of the first coil 32, the second coil 34, and the rotor shaft 37 fixed with the magnet 36 can be assembled from in one direction, which leads to high assembly operability.

Reference numeral 38 denotes a cover, which is positioned such that: a projection 31i provided at a tip end of the first outer tooth portion 31a of the stator 31 is fitted into a fitting hole 38b; and a projection 31j provided at a tip end of the fourth outer tooth portion 31d is fitted into a fitting hole 38c. The cover 38 is fixed to the stator 31 in the state in which tip ends of the first outer tooth portion 31a, second outer tooth portion 31b, third outer tooth portion 31c, fourth outer tooth portion 31d, fifth outer tooth portion 31e, and sixth outer tooth portion 31f abut with a rear surface of the cover 38. Further, symbol 38a denotes a bearing attaching portion, to which the bearing 39 is fixed by caulking, adhesion, or the like. The bearing 39 is laxly fitted to the holding shaft portion 37d of the rotor shaft 37 to rotatably hold the rotor shaft 37. The bearings 39 and 40 rotatably hold the rotor shaft 37, and also regulate the movement of the rotor shaft 37 in the axial direction within a predetermined range in the state in which the cover 38 is fixed to the stator 31. In this state, as to the magnet 36 fixed to the rotor shaft 37, a predetermined gap between the outer circumferential surface of the magnet 36 and the first outer tooth portion 31a, second outer tooth portion 31b, third outer tooth portion 31c, fourth outer tooth portion 31d, fifth outer tooth portion 31e, and sixth outer tooth portion 31f; a predetermined gap between the upper surface of the magnet 36 and the rear surface of the cover 38 is ensured; and a predetermined gap between the lower surface of the magnet 36 and the first bobbin 33 and the second bobbin 34 is ensured. Thus, the magnet 36 is arranged to be adjacent to the first coil 32 and second coil 34 in the axial direction, and the first coil 32 and the second coil 34 are adjacent to each other on the plane perpendicular to the axial direction. Therefore, there can be provided the motor of which length is short in the axial direction.

Figure 13:
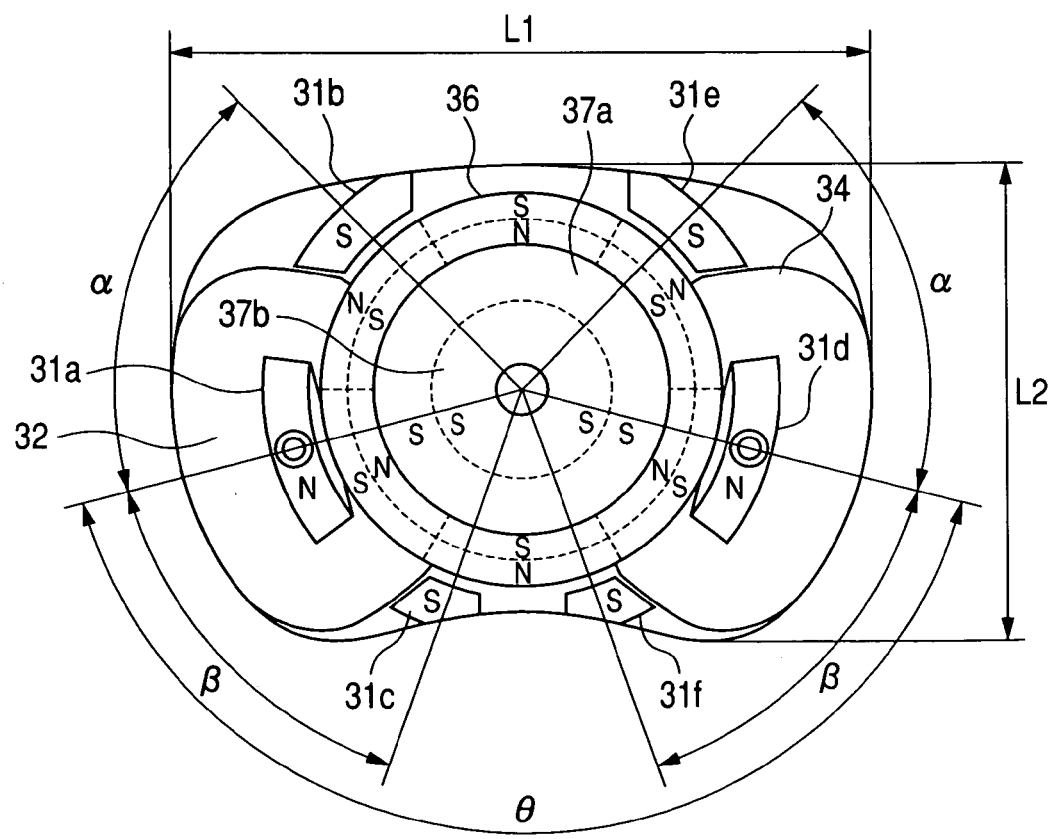
FIG. 13 is a sectional view showing the phase relationship between a magnet and a stator in the motor of FIG. 11.

FIG. 13 is a sectional view showing the positional relationship between the magnet 36 and the stator 31. As apparent from FIG. 13, in the magnet 36, the outer circumferential surface and inner circumferential surface are uniformly divided into multiple portions in a circumferential direction (6 divisions in Embodiment 2), which are alternately magnetized to south poles and north poles, thereby forming magnetized portions. When the outer circumferential surface has the south pole, the corresponding inner circumferential surface has the north pole. In contrast, when the outer circumferential surface has the north pole, the corresponding inner circumferential surface has the south pole.

Here, description will be made of the positional relationship between the magnet 36 and the outer magnetic pole portions.

The first outer tooth portion 31a and the fourth outer tooth portion 31d are disposed shifted from each other by θ degree in phase about a rotation center of the magnet 36 is taken as a vertex. Here, the θ degree is (180°–180°/n) (n=the number of magnetized divisions). In Embodiment 2, the θ degree is 150° because n=6. By adopting the θ degree (=180°–180°/n), the dimension of L2 in FIG. 13 can be set at an extremely small value.

It is sufficient that the first outer tooth portion 31a and the fourth outer tooth portion 31d be disposed shifted from each other by (180/n)°, that is, 30° in phase in Embodiment 2 with respect to a magnetization phase of the magnet 36. The angle θ which is made by the first outer tooth portion 31a and the fourth outer tooth portion 31d with the rotation center of the magnet 36 taken as the vertex, can be represented by the expression, (B×360/n–180/n). Note that B is a positive integer not more than n. The angle θ which is made by the first outer tooth portion 31a and the fourth outer tooth portion 31d with the rotation center of the magnet 36 taken as the vertex, may be any of 30°, 90°, 150°, 210°, 270°, and 330°. However, in the case of 30° and 330°, the first coil 32 and the second coil 34 are difficult to be disposed. Further, in the case of 90° and 270°, the positions of the magnetic force of the magnet 36 and the electromagnetic force become unbalanced. Thus, vibration is apt to be generated in the rotation of the magnet 36, and the dimension of L2 cannot be reduced. In order to make the dimension of L2 small, it is sufficient that: the equation B=n/2 be established, that is, B=3 be adopted; and the θ degree be set to (180°–180°/n), that is, 150°. At this point, the positions of the magnetic force of the magnet 36 and the electromagnetic force are in a nearly bilateral-symmetrical state, and the generation of vibration is suppressed to the minimum. Further, the second outer tooth portion 31b and the third outer tooth portion 31c, which form the second outer magnetic pole portion, and the fifth outer tooth portion 31e and the sixth outer tooth portion 31f, which form the fourth outer magnetic pole portion, are arranged to be opposed to the outer circumferential surface of the magnet. As a result, the rotation balance of the magnet 36 can be further improved.

Next, description will be made of the positional relationship between the first outer magnetic pole portion and the second outer magnetic pole portion and the positional relationship between the third outer magnetic pole portion and the fourth outer magnetic pole portion.

When the rotation center of the magnet 36 is taken as the reference, the first outer tooth portion 31a, which serves as the first outer magnetic pole portion, and the second outer tooth portion 31b, which serves as a part of the second outer magnetic pole portion, are arranged such that the respective centers of the opposing portions to the magnet 36 are shifted from each other by α degree in phase. When the α degree is set to 360/n, the pole, to which center of the opposing portion of the first outer tooth portion 31a with respect to the magnet 36 is opposed, is different from the pole, to which center of the opposing portion of the second outer tooth portion 31b with respect to the magnet 36 is opposed. That is, the second outer tooth portion 31b, which is adjacently arranged to the outer circumference of the first coil 32, and the first outer tooth portion 31a, which is arranged in the inner circumference of the first coil 32, are excited to the different poles from each other. Thus, the second outer tooth portion 31b effectively acts on the magnet 36, as the outer magnetic pole. Here, the opposing portion of the second outer tooth portion 31b has a predetermined width. Thus, the effect is maintained even if the α degree has a range to some extent. Therefore, the second outer tooth portion 31b as the outer magnetic pole effectively acts on the magnet 36 even when the α degree is set to have a range of $(270/n) \leq \alpha \leq (450/n)$.

Similarly, when the rotation center of the magnet 36 is taken as the reference, the fourth outer tooth portion 31d, which serves as the third outer magnetic pole portion, and the fifth outer tooth portion 31e, which serves as the fourth outer magnetic pole portion, are arranged such that the respective centers of the opposing portions to the magnet 36 are shifted from each other by α degree in phase. Thus, the fifth outer tooth portion 31e effectively acts on the magnet 36, as the outer magnetic pole. Further, when the rotation center of the magnet 36 is taken as the reference, the first outer tooth portion 31a, which serves as the first outer magnetic pole portion, and the third outer tooth portion 31c, which serves as the second outer magnetic pole portion, are arranged such that the respective centers of the opposing portions to the magnet 36 are shifted from each other by β degree in phase. When the β degree is set to 360/n, the pole, to which the center of the opposing portion of the first outer tooth portion 31a with respect to the magnet 36 is opposed, is different from the pole, to which the center of the opposing portion of the third outer tooth portion 31c with respect to the magnet 36 is opposed. That is, the third outer tooth portion 31c, which is adjacently arranged to the outer circumference of the first coil 32, and the first outer tooth portion 31a, which is arranged in the inner circumference of the first coil 32, are excited to the different poles from each other. Thus, the third outer tooth portion 31c effectively acts on the magnet 36, as the outer magnetic pole. Here, the opposing portion of the third outer tooth portion 31c has a predetermined width. Thus, the effect can be maintained even if the β degree has a range to some extent. Therefore, the third outer tooth portion 31c as the outer magnetic pole effectively acts on the magnet 36 even when the β degree is set to have a range of $(270/n) \geq \beta \leq (450/n)$.

Similarly, when the rotation center of the magnet 36 is taken as the reference, the fourth outer tooth portion 31d, which serves as the third outer magnetic pole portion, and the sixth outer tooth portion 31f, which serves as the fourth outer magnetic pole portion, are arranged such that the respective centers of the opposing portions to the magnet 36 are shifted from each other by the β degree in phase. The sixth outer tooth portion 31f effectively acts on the magnet 36, as the outer magnetic pole portion. Note that, since n=6 is established in Embodiment 2, it is sufficient that the α degree and the β degree each be set not smaller than 45° and not greater than 75°. Further, the a degree and the β degree are most desirably the same, but may not be the same depending on a driving method (they are desirably the same in terms of step precision in 1-2 phase excitation drive, but may somewhat differ without inconvenience in 2 phase excitation drive).

With the above-described structure, the first outer tooth portion 31a as the first outer magnetic pole portion and the second outer tooth portion 31b and third outer tooth portion 31c, which form the second outer magnetic pole portion, and the fourth outer tooth portion 31d as the third outer magnetic pole portion and the fifth outer tooth portion 31e and sixth outer tooth portion 31f, which form the fourth outer magnetic pole portion, are structured to be opposed to the same magnet in the respective different angle ranges. Therefore, the magnet 36 can be structured to be short in the axial direction, which enables a short motor from the viewpoint of the length in the direction parallel to the axial direction.

As the major characteristic of the above structure, when attention is paid to a part of the outer circumferential surface of the magnet 36, the rotation of the magnet 36 makes the magnetic flux between the first outer magnetic pole portion and the second outer magnetic pole portion, which are excited by the first coil 32, and the magnetic flux between the third outer magnetic pole portion and the fourth outer magnetic pole portion, which are excited by the second coil 34, alternately act on the part of the magnet 36. The outer magnetic pole portions make the magnetic fluxes act on the same part of the magnet 36. Accordingly, there can be provided the motor which is not susceptible to bad influences due to variation in magnetization, and the like, and which has stable performance.

Next, description will be made of an operation of the stepping motor in accordance with Embodiment 2 with reference to FIGS. 13 to 16.

In the motor shown in FIG. 13, the first coil 32 is energized to perform excitation such that: the first outer tooth portion 31a of the stator 31 has the north pole; the second outer tooth portion 31b and the third outer tooth portion 31c have the south poles; and the first inner magnetic pole portion (the parts of the first columnar portion 37a and second columnar portion 37b, which oppose the first outer tooth portion 31a) has the south pole. Also, the second coil 34 is energized to perform excitation such that: the fourth outer tooth portion 31d has the north pole; the fifth outer tooth portion 31e and the sixth outer tooth portion 31f have the south poles; and the second inner magnetic pole portion (the parts of the first columnar portion 37a and second columnar portion 37b, which oppose the fourth outer tooth portion 31d) has the south pole.

In the state of FIG. 13, only the energization direction to the first coil 32 is inverted, and excitation is performed such that: the first outer tooth portion 31a has the south pole; the second outer tooth portion 31b and the third outer tooth portion 31c have the north poles; and the first inner magnetic pole portion (the parts of the first columnar portion 37a and second columnar portion 37b, which oppose the first outer tooth portion 31a) has the north pole. As a result, the magnet 36 is rotated by 30° in the counterclockwise direction, as shown in FIG. 14.

Figure 14:
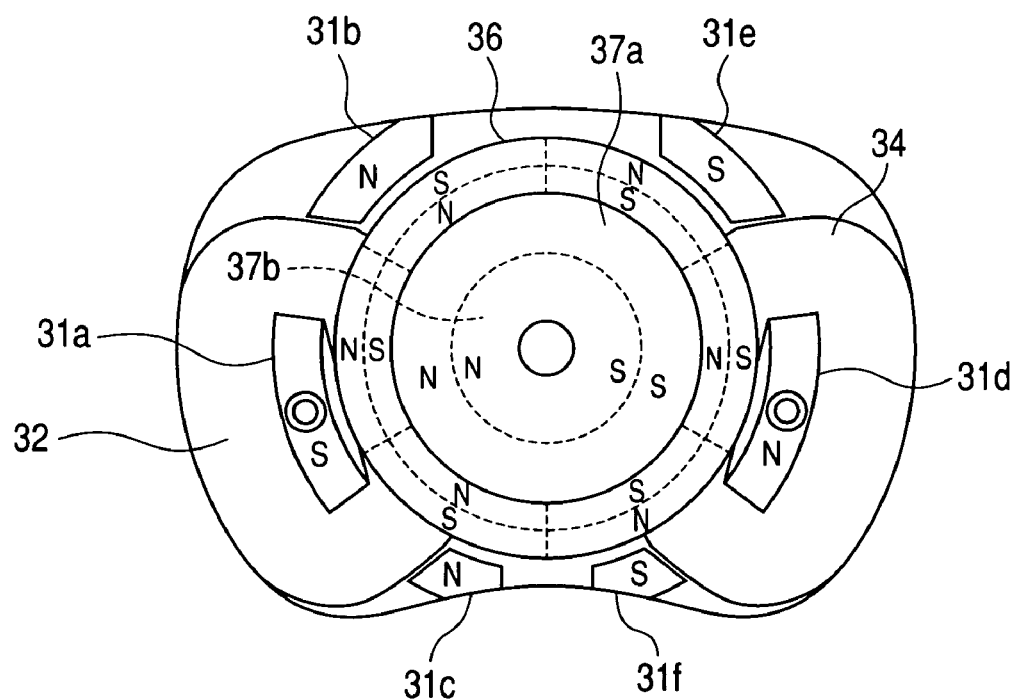
FIG. 14 is a sectional view showing the state in which the magnet has been rotated by 30° by switching coil energization from the state of FIG. 13.

In the state of FIG. 14, only the energization direction to the second coil 34 is inverted, and excitation is performed such that: the fourth outer tooth portion 31d has the south pole; the fifth outer tooth portion 31e and the sixth outer tooth portion 31f have the north poles; and the second inner magnetic pole portion (the parts of the first columnar portion 37a and second columnar portion 37b, which oppose the fourth outer tooth portion 31d) has the north pole. As a result, the magnet 36 is rotated by 30° in the counterclockwise direction, as shown in FIG. 15.

Figure 15:
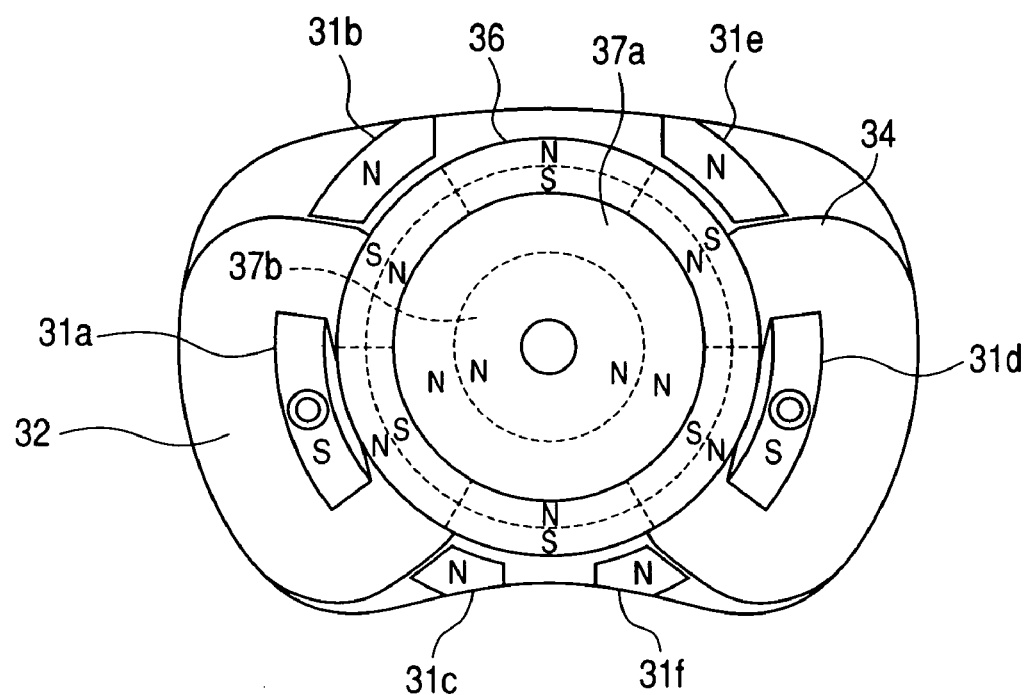
FIG. 15 is a sectional view showing the state in which the magnet has been further rotated by 30° by switching coil energization from the state of FIG. 14.
Figure 16:
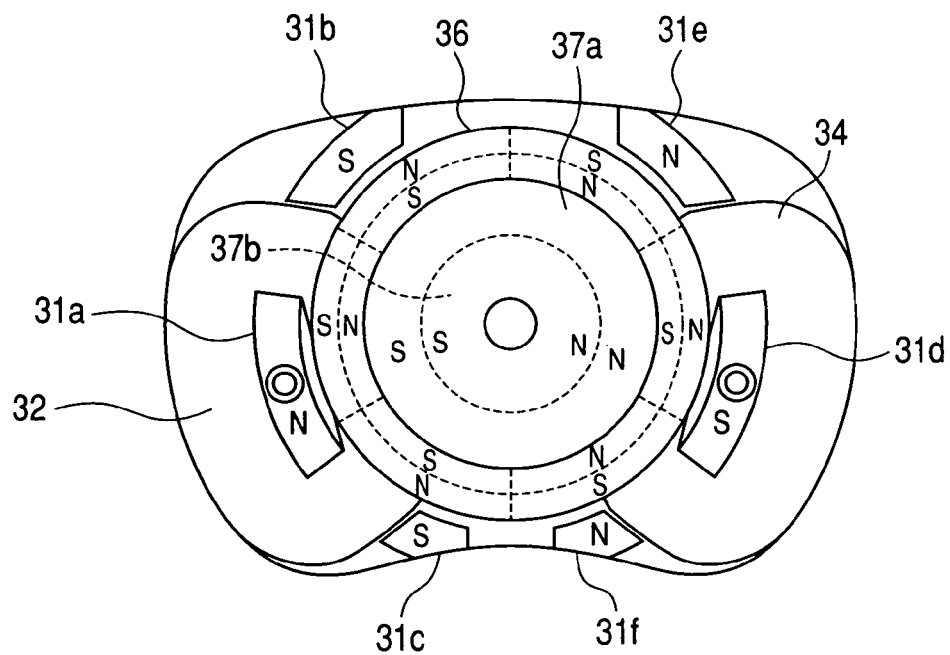
FIG. 16 is a sectional view showing the state in which the magnet has been further rotated by 30° by switching coil energization from the state of FIG. 15.
Figure 17:
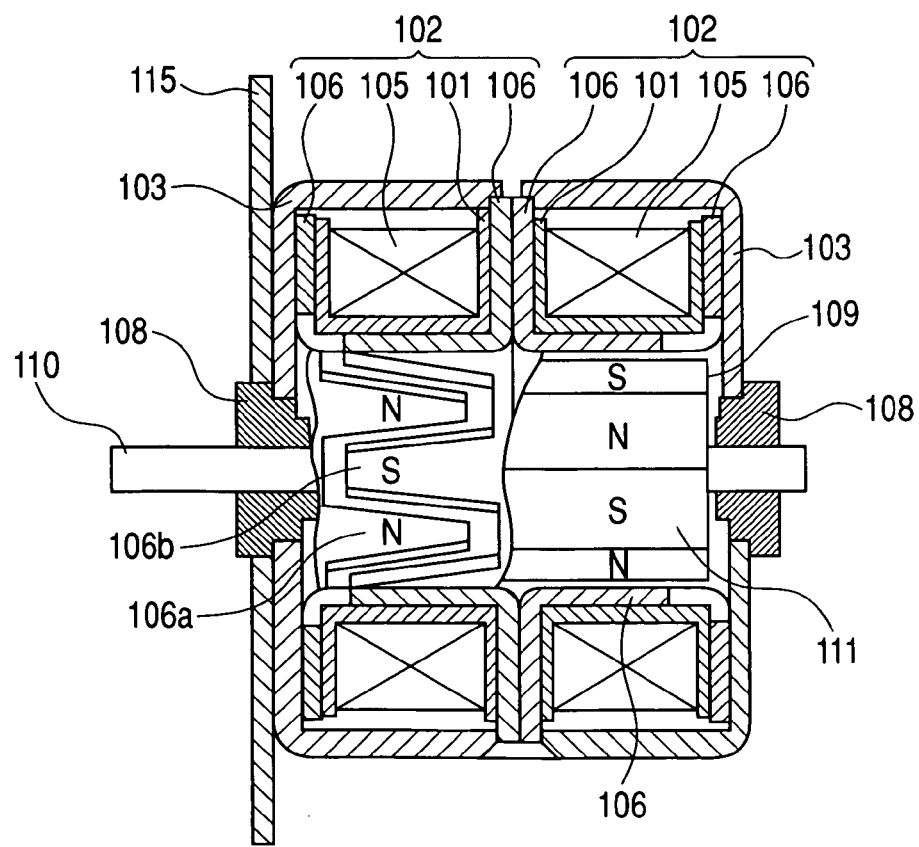
FIG. 17 is a longitudinal sectional view showing a structural example of a conventional stepping motor.
Figure 18:
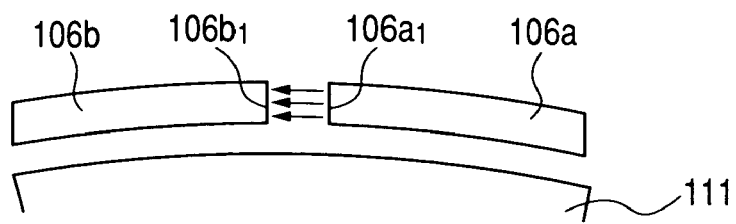
FIG. 18 is a partial sectional view schematically showing a state of a magnetic flux of a stator in the stepping motor shown in FIG. 17.
Figure 19:
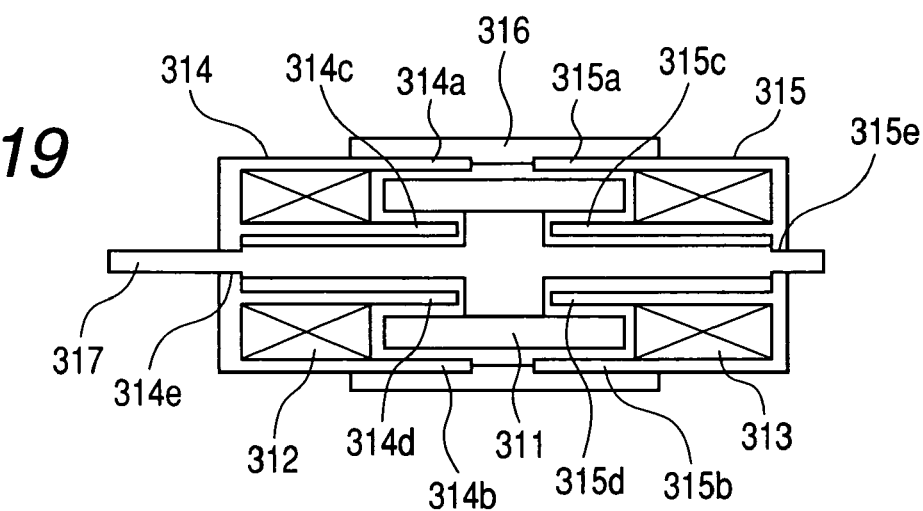
FIG. 19 is a longitudinal sectional view schematically showing another structural example of a conventional cylindrical stepping motor.
Figure 20:
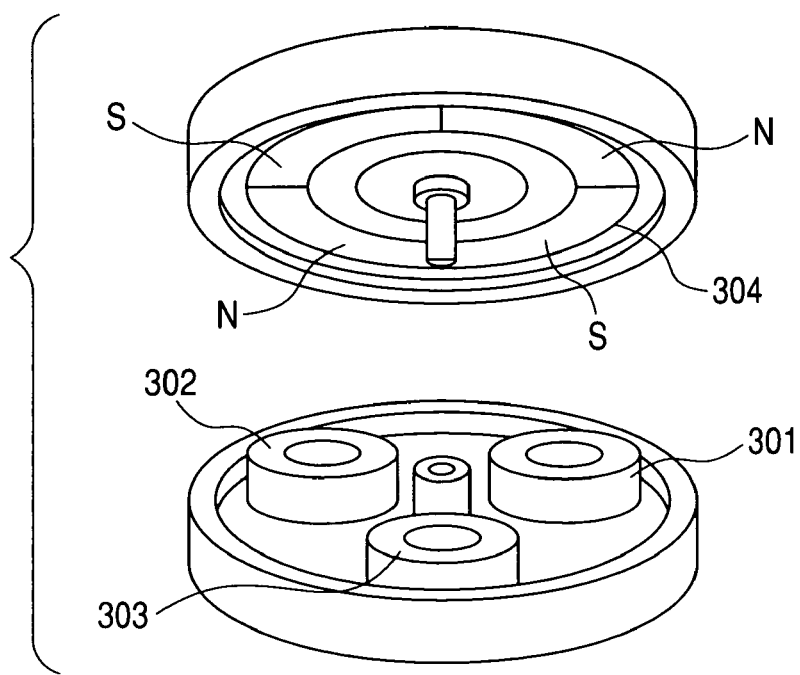
FIG. 20 is a structural view of a conventional thin coin-shaped motor.
Figure 21:
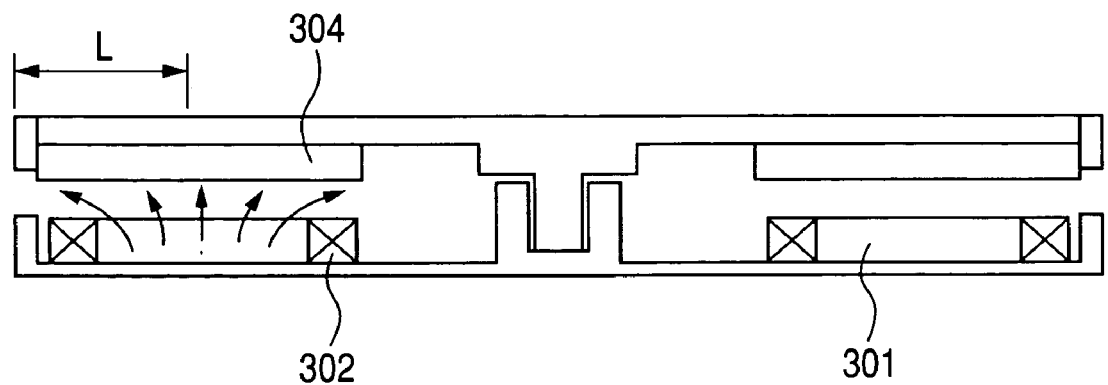
FIG. 21 is a sectional view showing a state of a magnetic flux of the motor shown in FIG. 20.

In the state of FIG. 15, only the energization direction to the first coil 32 is inverted, and excitation is performed such that: the first outer tooth portion 31a has the north pole; the second outer tooth portion 31b and the third outer tooth portion 31c have the south poles; and the first inner magnetic pole portion (the parts of the first columnar portion 37a and second columnar portion 37b, which oppose the first outer tooth portion 31a) has the south pole. As a result, the magnet 36 is rotated by 30° in the counterclockwise direction, as shown in FIG. 16.

Thereafter, the energization directions to the first coil 32 and the second coil 34 are sequentially switched. Thus, switching of excitation of the first outer magnetic pole portion and second outer magnetic pole portion is performed at different timings from that of the third outer magnetic pole portion and fourth outer magnetic pole portion, as a result of which the magnet 36 is rotated to the position corresponding to the energization phase.

In Embodiment 2, the magnet 36 is rotated by switching the energization state in order of first energization state, second energization state, third energization state, and fourth energization state (2-phase drive), where the first energization state is defined as forward-direction energization to the first coil 32 and forward-direction energization to the second coil 34; the second energization state is defined as inverse-direction energization to the first coil 32 and forward-direction energization to the second coil 34; the third energization state is defined as inverse-direction energization to the first coil 32 and inverse-direction energization to the second coil 34; and the fourth energization state is defined as forward-direction energization to the first coil 32 and inverse-direction energization to the second coil 34. However, the magnet 36 can also be rotated to the rotation position corresponding to energization phase by switching the energization state in order of fifth energization state, sixth energization state, seventh energization state, and eighth energization state (1-2 phase excitation drive), where the fifth energization state is defined as forward-direction energization to the first coil 32 and non-energization to the second coil 34 are adopted in; the sixth energization state is defined as non-energization to the first coil 32 and forward-direction energization to the second coil 34; the seventh energization state is defined as inverse-direction energization to the first coil 32 and non-energization to the second coil 34; and the eighth energization state is defined as non-energization to the first coil 32 and inverse-direction energization to the second coil 34.

Next, description will be made of the phase relationship between the magnet 36 and the first outer tooth portion 31a as the first outer magnetic pole portion, the second outer tooth portion 31b and third outer tooth portion 31c, which form the second outer magnetic pole portion, the fourth outer tooth portion 31d as the third outer magnetic pole portion, or the fifth outer tooth portion 31e and sixth outer tooth portion 31f, which form the fourth outer magnetic pole portion.

When the energization state is switched from the first energization state through the second energization state and the third energization state to the fourth energization state as described above, switching of the polarities to be excited is performed alternately to the first outer magnetic pole portion and second outer magnetic pole portion and to the third outer magnetic pole portion and fourth outer magnetic pole portion.

As shown in FIG. 13, forward energization to the first coil 32 is conducted, thereby exciting the first outer magnetic pole portion to the north pole and exciting the second outer magnetic pole portion to the south pole. Then, a rotational force in the clockwise direction in the figure is generated in the magnet 36 so that the center of the first outer tooth portion 31a conforms to the center of the magnetized portion (the center of the south pole) of the magnet 36. At the same time, forward energization to the second coil 34 is conducted also, thereby exciting the third outer magnetic pole portion to the north pole and exciting the fourth outer magnetic pole portion to the south pole. Then, a rotational force in the counterclockwise direction in the figure is generated in the magnet 36 so that the center of the fourth outer tooth portion 31d conforms to the center of the magnetized portion (the center of the south pole) of the magnet 36. Thus, the magnet 36 rests in the state in which the rotational forces are balanced during the energization to both the coils. This is shown in the state in FIG. 13. When the energization amounts to both the coils are equal to each other, both the phase difference between the center of the first outer tooth portion 31a and the center of the magnetized portion (the center of the south pole) of the magnet 36 and the phase difference between the center of the fourth outer tooth portion 31d and the center of the magnetized portion (the center of the south pole) of the magnet 36 are approximately 15°. At this point, the second outer tooth portion 31b excited to the south pole is opposed to the north pole of the magnet 36, the third outer tooth portion 31c excited to the south pole is also opposed to the north pole of the magnet 36, the fifth outer tooth portion 31e excited to the south pole is opposed to the north pole of the magnet 36, and the sixth outer tooth portion 31f excited to the south pole is also opposed to the north pole of the magnet 36.

The first coil 32 is switched to inverse energization from the state in FIG. 13, whereby the first outer magnetic pole portion is excited to the south pole, and the second outer magnetic pole portion is excited to the north pole. Then, a rotational force in the counterclockwise direction in the figure is generated in the magnet 36 so that the center of the first outer tooth portion 31a conforms to the center of the magnetized portion (the center of the north pole) of the magnet 36. At the same time, a rotational force in the counterclockwise direction in the figure is generated so that the second outer tooth portion 31b is opposed to the south pole of the magnet 36, and also, a rotational force in the counterclockwise direction in the figure is generated so that the third outer tooth portion 31c is opposed to the south pole of the magnet 36. Here, the forward energization is kept to the second coil 34. Thus, a rotational force in the counterclockwise direction in the figure is generated in the magnet 36 so that the center of the fourth outer tooth portion 31d conforms to the center of the magnetized portion (the center of the south pole) of the magnet 36. As a result, the magnet 36 starts to be rotated in the counterclockwise direction from the state in FIG. 13.

After the magnet is rotated by approximately 15° in the counterclockwise direction from the state in FIG. 13, the center of the fourth outer tooth portion 31d conforms to the center of the magnetized portion (the center of the south pole) of the magnet 36. The fifth outer tooth portion 31e and the sixth outer tooth portion 31f are still opposed to the north poles of the magnet 36. At this point, the center of the first outer tooth portion 31a conforms to the boundary of the magnetized portion (boundary between the south pole and the north pole) of the magnet 36. In this state, there is further generated the rotational force in the counterclockwise direction. Then, when the magnet is further rotated by approximately 15° in the counterclockwise direction from the state (rotated by approximately 30° in the counterclockwise direction from the state in FIG. 13), the rotational forces of both the coils are balanced. The magnet rests at the position. This is shown in the state in FIG. 16. At this time, the second outer tooth portion 31b and third outer tooth portion 31c, which are excited to the north poles, are opposed to the south poles of the magnet 36, and the fifth outer tooth portion 31e and sixth outer tooth portion 31f, which are excited to the south poles, are opposed to the north poles of the magnet 36.

The second coil 34 is switched to inverse energization from the state in FIG. 14, whereby the third outer magnetic pole portion is excited to the south pole, and the fourth outer magnetic pole portion is excited to the north pole. Then, a rotational force in the counterclockwise direction in the figure is generated in the magnet 36 so that the center of the fourth outer tooth portion 31d conforms to the center of the magnetized portion (the center of the north pole) of the magnet 36. At the same time, a rotational force in the counterclockwise direction in the figure is generated so that the fifth outer tooth portion 31e is opposed to the south pole of the magnet 36, and also, a rotational force in the counterclockwise direction in the figure is generated so that the sixth outer tooth portion 31f is opposed to the south pole of the magnet 36. Here, the inverse energization is kept to the first coil 32. Thus, a rotational force in the counterclockwise direction in the figure is generated in the magnet 36 so that the center of the first outer tooth portion 31a conforms to the center of the magnetized portion (the center of the north pole) of the magnet 36. As a result, the magnet 36 starts to be rotated in the counterclockwise direction from the state in FIG. 14.

After the magnet is rotated by approximately 15° in the counterclockwise direction from the state in FIG. 14, the center of the first outer tooth portion 31a conforms to the center of the magnetized portion (the center of the north pole) of the magnet 36. The second outer tooth portion 31b and the third outer tooth portion 31c are still opposed to the south poles of the magnet 36. At this point, the center of the fourth outer tooth portion 31d conforms to the boundary of the magnetized portion (boundary between the south pole and the north pole) of the magnet 36. In this state, there is further generated the rotational force in the counterclockwise direction. Then, when the magnet is further rotated by approximately 15° in the counterclockwise direction from the state (rotated by approximately 30° in the counterclockwise direction from the state in FIG. 14), the rotational forces of both the coils are balanced. The magnet rests at the position. This is shown in the state in FIG. 15. At this time, the second outer tooth portion 31b and third outer tooth portion 31c, which are excited to the north poles, are opposed to the south poles of the magnet 36, and the fifth outer tooth portion 31e and sixth outer tooth portion 31f, which are excited to the north poles, are opposed to the south poles of the magnet 36.

The first coil 32 is switched to forward energization from the state in FIG. 15, whereby the first outer magnetic pole portion is excited to the north pole, and the second outer magnetic pole portion is excited to the south pole. Then, a rotational force in the counterclockwise direction in the figure is generated in the magnet 36 so that the center of the first outer tooth portion 31a conforms to the center of the magnetized portion (the center of the south pole) of the magnet 36. At the same time, a rotational force in the counterclockwise direction in the figure is generated so that the second outer tooth portion 31b is opposed to the north pole of the magnet 36, and also, a rotational force in the counterclockwise direction in the figure is generated so that the third outer tooth portion 31c is opposed to the north pole of the magnet 36. Here, the inverse energization is kept to the second coil 34. Thus, a rotational force in the counterclockwise direction in the figure is generated in the magnet 36 so that the center of the fourth outer tooth portion 31d conforms to the center of the magnetized portion (the center of the north pole) of the magnet 36. As a result, the magnet 36 starts to be rotated in the counterclockwise direction from the state in FIG. 15.

After the magnet is rotated by approximately 15° in the counterclockwise direction from the state in FIG. 15, the center of the fourth outer tooth portion 31d conforms to the center of the magnetized portion (the center of the north pole) of the magnet 36. The fifth outer tooth portion 31e and the sixth outer tooth portion 31f are still opposed to the south poles of the magnet 36. At this point, the center of the first outer tooth portion 31a conforms to the boundary of the magnetized portion (boundary between the south pole and the north pole) of the magnet 36. In this state, there is further generated the rotational force in the counterclockwise direction. Then, when the magnet 36 is further rotated by approximately 15° in the counterclockwise direction from the state (rotated by approximately 30° in the counterclockwise direction from the state in FIG. 15), the rotational forces of both the coils are balanced. The magnet rests at the position. This is shown in the state in FIG. 16. At this time, the second outer tooth portion 31b and third outer tooth portion 31c, which are excited to the south poles, are opposed to the north poles of the magnet 36, and the fifth outer tooth portion 31e and sixth outer tooth portion 31f, which are excited to the north poles, are opposed to the south poles of the magnet 36.

In accordance with Embodiment 2, the magnetic flux generated by the first coil 32 crosses the magnet 36 between the first outer magnetic pole portion and the first inner magnetic pole portion, and the magnetic flux generated by the second coil 34 crosses the magnet 36 between the third outer magnetic pole portion and the second inner magnetic pole portion. Thus, the magnetic fluxes can be made to effectively act on the magnet 36. As a result, the motor output can be improved. Further, the magnetic flux generated by the first coil 32 also acts on the second outer magnetic pole portion, and the magnetic flux generated by the second coil 34 also acts on the fourth outer magnetic pole portion, which leads to the further improvement of the motor output. In addition, the outer magnetic poles, which oppose the outer circumference of the magnet, can be increased in number without increasing the outer diameter of the motor. Therefore, the rotation balance is improved, which leads to an improved silencing effect.

Further, the magnet 36 is composed of the hollow cylindrical plastic magnet material formed by injection molding or the like. Thus, the radial thickness of the cylindrical shape can be reduced extremely. Also, the first columnar portion 37a, which forms the inner magnetic pole portion while opposes the inner circumferential surface of the magnet 36, does not need to be provided with a gap with respect to the inner circumferential surface of the magnet 36. Therefore, the distance between the first outer tooth portion 31a and the first columnar portion 37a and the distance between the fourth outer tooth portion 31d and the first columnar portion 37a can be made extremely short. As a result, magnetic resistances of a magnetic circuit, which is constituted by the first coil 32, first outer magnetic pole portion, and first inner magnetic pole portion, and a magnetic circuit, which is constituted by the second coil 34, third outer magnetic pole portion, and second inner magnetic pole portion, can be made small. Therefore, the motor output can be improved more.

Further, the inner diameter portion of the magnet 36 is filled with the rotor shaft 37. Thus, the mechanical strength of the magnet is large.

Further, in Embodiment 2, it is only needed that the gap of the outer diameter portion of the magnet 36 is managed, which enables easy assembly. In addition, the output shaft also serves as the inner magnetic pole portion. Thus, the length in the axial direction, in which the inner magnetic pole portion opposes the magnet 36, can be secured long sufficiently. Accordingly, the first outer magnetic pole portion, second outer magnetic pole portion, third outer magnetic pole portion, fourth outer magnetic pole portion, and magnet 36 can be utilized effectively, which leads to the increase in the motor output.

Further, the first outer tooth portion 31a as the first outer magnetic pole portion, the second outer tooth portion 31b and third outer tooth portion 31c, which form the second outer magnetic pole portion, the fourth outer tooth portion 31d as the third outer magnetic pole portion, and the fifth outer tooth portion 31e and sixth outer tooth portion 31f, which form the fourth outer magnetic pole portion, each are composed of the comb tooth that extends in the direction parallel to the rotor shaft 37. Thus, the dimension in the direction perpendicular to the motor shaft can be suppressed to the minimum. Also, there is provided a structure in which the assembly of the first coil 32 and second coil 34 is easy.

Moreover, the first outer tooth portion 31a as the first outer magnetic pole portion and the second outer tooth portion 31b and third outer tooth portion 31c, which form the second outer magnetic pole portion, and the fourth outer tooth portion 31d as the third outer magnetic pole portion and the fifth outer tooth portion 31e and sixth outer tooth portion 31f, which form the fourth outer magnetic pole portion, are structured to be opposed to the same magnet in the respective different angle ranges. Therefore, the magnet 36 can be structured to be short in the axial direction, which enables a short motor from the viewpoint of the length in the direction parallel to the axial direction.

Specifically, there is provided a structure in which the magnetic flux generated in the magnetic circuit, which is constituted by the first coil 32, the first outer magnetic pole portion and second outer magnetic pole portion, and the first inner magnetic pole portion, and the magnetic flux generated in the magnetic circuit, which is constituted by the second coil 34, the third outer magnetic pole portion and fourth outer magnetic pole portion, and the second inner magnetic pole portion, act on the same magnet portion. Due to the rotation of the magnet 36, the respective magnetic circuits act on the same circumference of the magnet 36, and use the same part of the magnet 36. Since the same part of the magnet 36 is used, there can be provided a motor which is not susceptible to bad influences due to variation in magnetization, and the like, and which has stable performance.

Further, when the first outer magnetic pole portion, second outer magnetic pole portion, third outer magnetic pole portion, and fourth outer magnetic pole portion are formed by using the same member, an error in mutual positions can be suppressed low. Also, there can be provided a motor which needs the smaller number of components and of which structure is simple, which leads to reduction in costs.

Furthermore, when the number of magnetized poles on the outer circumferential surface of the magnet 36 is set to N, the first outer tooth portion 31a is formed to be shifted from the fourth outer tooth portion 31d by $(180/n)°$ in phase. Thus, the magnet 36 can be rotated to the position corresponding to the energization state by sequentially switching the energization directions to the first coil 32 and the second coil 34 at the different timings. Accordingly, the motor can be made to function as a stepping motor which enables bidirectional rotation.

Lastly, there will be collectively enumerated the effects of Embodiment 1 and Embodiment 2.

1) The motor in Embodiment 1 includes: the first outer magnetic pole portion which is disposed at the inner circumference of the first coil 2 and which is opposed to the outer circumferential surface of the magnet 7 in the first predetermined angle range; the second outer magnetic pole portion which is disposed adjacent to the outer circumference of the first coil 2 and which is opposed to the outer circumferential surface of the magnet 7; the first inner magnetic pole portion which is disposed adjacent to the outer circumference of the first coil 2 and which is opposed to the inner circumferential surface of the magnet 7; the third outer magnetic pole portion which is excited by the second coil 4, which is disposed at the inner circumference of the second coil 4, and which is opposed to the outer circumferential surface of the magnet 7 within the second predetermined angle range; the fourth outer magnetic pole portion which is disposed adjacent to the outer circumference of the second coil 4 and which is opposed to the outer circumferential surface of the magnet 7; and the second inner magnetic pole portion which is disposed adjacent to the outer circumference of the second coil 4 and which is opposed to the inner circumferential surface of the magnet 7.

Thus, the magnetic flux generated by the first coil 2 crosses the magnet 7 between the first outer magnetic pole portion and the first inner magnetic pole portion, and the magnetic flux generated by the second coil 4 crosses the magnet 7 between the third outer magnetic pole portion and the second inner magnetic pole portion. Thus, the magnetic fluxes effectively act on the magnet 7. As a result, the output can be improved. Further, the magnetic flux generated by the first coil 2 also acts on the second outer magnetic pole portion, and the magnetic flux generated by the second coil 4 also acts on the fourth outer magnetic pole portion, which leads to the further improvement of the motor output. In addition, the outer magnetic poles, which oppose the outer circumference of the magnet, can be increased in number without increasing the outer diameter of the motor. Therefore, the rotation balance is improved, which leads to an improved silencing effect. Moreover, there can be provided the motor of which length in the direction of the rotary shaft is reduced in comparison with the conventional compact motor. Furthermore, the two magnetic circuits for driving the motor act on the same part of the magnet 7. Therefore, there can be provided the motor which is not susceptible to influences due to variation in magnetization of the magnet 7 and which has high rotation precision.

2) The motor in Embodiment 2 includes: the rotor shaft 37 which is fixed to the inner diameter portion of the magnet 36 and which is composed of the soft magnetic material; the first outer magnetic pole portion which is disposed at the inner circumference of the first coil 32 and which is opposed to the outer circumferential surface of the magnet 36 within the first predetermined angle range; the second outer magnetic pole portion which is disposed adjacent to the outer circumference of the first coil 32 and which is opposed to the outer circumferential surface of the magnet 36; the third outer magnetic pole portion which is excited by the second coil 34, which is disposed at the inner circumference of the second coil 34, and which is opposed to the outer circumferential surface of the magnet 36 within the second predetermined angle range; and the fourth outer magnetic pole portion which is disposed adjacent to the outer circumference of the second coil 34 and which is opposed to the outer circumferential surface of the magnet 36.

Thus, when the part of the rotor shaft 37, which is opposed to the first outer magnetic pole portion, is termed the first inner magnetic pole portion, the magnetic flux generated by the first coil 32 passes between the first outer magnetic pole portion opposed to the outer circumferential surface of the magnet 36 and the first inner magnetic pole portion of the rotor shaft 37 fixed to the inner circumferential surface of the magnet 36. Thus, the magnetic flux effectively acts on the magnet 36. At this time, since the first inner magnetic pole portion of the rotor shaft 37 does not need to be provided with the gap with respect to the inner circumferential surface of the magnet 36, the distance between the outer magnetic pole portion and the inner magnetic pole portion can be made short. Therefore, the magnetic resistance is reduced, making it possible to increase the output. Similarly, when the part of the rotor shaft 37, which is opposed to the third outer magnetic pole portion, is termed the second inner magnetic pole portion, the magnetic flux generated by the second coil 34 passes between the third outer magnetic pole portion opposed to the outer circumferential surface of the magnet 36 and the second inner magnetic pole portion of the rotor shaft 37. Thus, the magnetic flux effectively acts on the magnet 36. At this time, since the second inner magnetic pole portion of the rotor shaft 37 opposed to the inner circumferential surface of the magnet 36 does not need to be provided with the gap with respect to the inner circumferential surface of the magnet 36, the distance between the outer magnetic pole portion and the inner magnetic pole portion can be made short. Therefore, the magnetic resistance is reduced, making it possible to increase the output.

Further, the first inner magnetic pole portion and the second inner magnetic pole portion are composed of the rotor shaft 37. This realizes easier manufacturing and lower costs in comparison with the case where the outer magnetic pole portion and the inner magnetic pole portion are connectedly or integrally formed. Further, the rotor shaft 37 is fixed to the inner diameter portion of the magnet 36, which leads to enhanced strength. Moreover, the magnetic flux generated by the first coil 32 also acts on the second outer magnetic pole portion, and the magnetic flux generated by the second coil 34 also acts on the fourth outer magnetic pole portion. This leads to the further improvement of the motor output. Moreover, the outer magnetic poles, which oppose the outer circumference of the magnet, can be increased in number without increasing the outer diameter of the motor. Therefore, the rotation balance is improved, which leads to an improved silencing effect. Furthermore, in the motor, the length in the direction of the rotary shaft can be further reduced in comparison with the conventional compact motor. Also, the two magnetic circuits for driving the motor act on the same part of the magnet 36. Therefore, there can be provided the motor which is not susceptible to influences due to variation in magnetization of the magnet 36 and which has high rotation precision.

3) The first outer magnetic pole portion, second outer magnetic pole portion, third outer magnetic pole portion, and fourth outer magnetic pole portion are formed by using the same member. Thus, the error in mutual positions can be suppressed low. Also, there can be provided the motor which requires the smaller number of components and of which structure is simple, which leads to reduction in costs.

4) The first outer magnetic pole portion and the third outer magnetic pole portion each are formed to have a comb-tooth shape which extends in the axial direction of the rotary shaft 8 or rotor shaft 37 and in the same direction. Thus, the dimension in the direction perpendicular to the rotary shaft 8 or rotor shaft 37 can be reduced, and also, the assembly of the coils can be performed easily.

5) The angle $\alpha$, which is formed by the center of the part of the first outer magnetic pole portion, which is opposed to the outer circumferential surface of the magnet 7, 36, and the center of the part of the second outer magnetic pole portion, which is opposed to the outer circumferential surface of the magnet 7, 36, with the rotation center of the motor taken as the vertex, and the angle $\beta$, which is formed by the center of the part of the third outer magnetic pole portion, which is opposed to the outer circumferential surface of the magnet 7, 36, and the center of the part of the fourth outer magnetic pole portion, which is opposed to the outer circumferential surface of the magnet 7, 36, are respectively set in the respective range of $(270/n) \leq \alpha \leq (450/n)$ and the range of $(270/n) \leq \beta \leq (450/n)$. Thus, not only the first outer magnetic pole portion but also the second outer magnetic pole portion effectively acts on the magnet 7, 36. Also, not only the third outer magnetic pole portion but also the fourth outer magnetic pole portion effectively acts on the magnet 7, 36.

6) Switching of excitation is performed to the first coil 2, 32 and the second coil 4, 34 at the different timings. Further, the angle $\theta$, which is formed by the first outer magnetic pole portion and the third outer magnetic pole portion, with the rotation center of the motor taken as the vertex, is expressed by $\theta = (180 - 180/n)$. Therefore, the motor can be operated as the stepping motor which enables bidirectional rotation by controlling the energization timings of the respective coils.

7) The rotary shaft 8 (rotor shaft 37) of the motor in Embodiment 1 or 2 is disposed to be parallel to the optical axis of the lens. Thus, there can be provided the optical apparatus such as the camera in which the motor has the small protrusion in the direction of the optical axis.

8) The motor is disposed such that the angle $\theta = (180 - 180/n)$, which is formed by the first outer magnetic pole portion and the third outer magnetic pole portion, with the rotation center of the motor taken as the vertex, is on the optical axis side. Thus, the motor can be disposed without increasing the outer diameter of the optical apparatus such as the camera.

9) The optical apparatus is provided with the diaphragm blades 16 to 21 which change the opening area of the opening portion as the optical path in correspondence with the rotation of the motor. Thus, the length in the direction parallel to the optical axis can be made short. As a result, there can be provided the optical apparatus such as the camera, which is provided with an inexpensive and compact motor which does not obstruct to other lens and structure and which realizes the improvement in output.

This application claims priority from Japanese Patent Application No. 2004-110711 filed on Apr. 5, 2004, which is hereby incorporated by reference herein.

What is claimed is:

1. A motor comprising:
   a rotatable rotor having a cylindrical magnet which is divided into n portions in a circumferential direction to be alternately magnetized to different magnetic poles;
   a first coil disposed adjacent to the magnet in a direction of a rotary shaft of the rotor;
   a first outer magnetic pole portion which is excited by the first coil, which is disposed at a center portion of the first coil, and which is opposed to an outer circumferential surface of the magnet within a first predetermined angle range;
   a second outer magnetic pole portion which is excited by the first coil, which is adjacent to an outer circumference of the first coil, and which is opposed to the outer circumferential surface of the magnet;
   a first inner magnetic pole portion which is excited by the first coil, which is adjacent to the outer circumference of the first coil, and which is opposed to an inner circumferential surface of the magnet;
   a second coil which is adjacent to the magnet in the direction of the rotary shaft of the rotor and which is disposed on the substantially same plane as the first coil;
   a third outer magnetic pole portion which is excited by the second coil, which is disposed at a center portion of the second coil, and which is opposed to the outer circumferential surface of the magnet within a second predetermined angle range;
   a fourth outer magnetic pole portion which is excited by the second coil, which is adjacent to an outer circumference of the second coil, and which is opposed to the outer circumferential surface of the magnet; and
   a second inner magnetic pole portion which is excited by the second coil, which is adjacent to the outer circumference of the second coil, and which is opposed to the inner circumferential surface of the magnet.

2. A motor according to claim 1, wherein the first outer magnetic pole portion, the second outer magnetic pole portion, the third outer magnetic pole portion, and the fourth outer magnetic pole portion are formed of the same member.

3. A motor according to claim 1, wherein the first outer magnetic pole portion and the third outer magnetic pole portion each have a comb-tooth shape that extends in a direction of a rotary shaft of the rotor.

4. A motor according to claim 1, wherein with a rotation center of the rotor taken as a vertex, an angle $\alpha$ formed by a center of a part of the first outer magnetic pole portion which is opposed to the outer circumferential surface of the magnet, and a center of a part of the second outer magnetic pole portion which is opposed to the outer circumferential surface of the magnet, and also the angle $\alpha$ formed by a center of a part of the third outer magnetic pole portion which is opposed to the outer circumferential surface of the magnet, and a center of a part of the fourth outer magnetic pole portion which is opposed to the outer circumferential surface of the magnet, is set in a range of $(270/n) \leqq \alpha \leqq (450/n)$.

5. A motor according to claim 1, wherein an angle $\theta$, which is formed by the first outer magnetic pole portion and the third outer magnetic pole portion, with a rotation center of the rotor taken as a vertex, is expressed by $\theta = (180 - 180/n)$.

6. An optical apparatus comprising:
a rotatable rotor having a cylindrical magnet which is divided into n portions in a circumferential direction to be alternately magnetized to different magnetic poles;
a first coil disposed adjacent to the magnet in a direction of a rotary shaft of the rotor;
a first outer magnetic pole portion which is excited by the first coil, which is disposed at a center portion of the first coil, and which is opposed to an outer circumferential surface of the magnet within a first predetermined angle range;
a second outer magnetic pole portion which is excited by the first coil, which is adjacent to an outer circumference of the first coil, and which is opposed to the outer circumferential surface of the magnet;
a first inner magnetic pole portion which is excited by the first coil, which is adjacent to the outer circumference of the first coil, and which is opposed to an inner circumferential surface of the magnet;
a second coil which is adjacent to the magnet in the direction of the rotary shaft of the rotor and which is disposed on the substantially same plane as the first coil;
a third outer magnetic pole portion which is excited by the second coil, which is disposed at a center portion of the second coil, and which is opposed to the outer circumferential surface of the magnet within a second predetermined angle range;
a fourth outer magnetic pole portion which is excited by the second coil, which is adjacent to an outer circumference of the second coil, and which is opposed to the outer circumferential surface of the magnet;
a second inner magnetic pole portion which is excited by the second coil, which is adjacent to the outer circumference of the second coil, and which is opposed to the inner circumferential surface of the magnet; and
an opening amount adjusting member which changes an opening area of an opening portion as an optical path in correspondence with rotation of the rotor.

7. A motor comprising:
a cylindrical magnet which is divided into n portions in a circumferential direction to be alternately magnetized to different magnetic poles;
a rotor which is fixed to an inner diameter portion of the magnet and which is formed of a soft magnetic material;
a first coil which is disposed adjacent to the rotor and adjacent to the magnet in an axial direction of the rotor;
a first outer magnetic pole portion which is excited by the first coil, which is disposed at a center portion of the first coil, and which is opposed to an outer circumferential surface of the magnet within a first predetermined angle range;
a second outer magnetic pole portion which is excited by the first coil, which is adjacent to an outer circumference of the first coil, and which is opposed to the outer circumferential surface of the magnet;
a second coil which is adjacent to the rotor, which is adjacent to the magnet in the axial direction of the rotor, and which is disposed on the substantially same plane as the first coil;
a third outer magnetic pole portion which is excited by the second coil, which is disposed at a center portion of the second coil, and which is opposed to the outer circumferential surface of the magnet within a second predetermined angle range; and
a fourth outer magnetic pole portion which is excited by the second coil, which is adjacent to an outer circumference of the second coil, and which is opposed to the outer circumferential surface of the magnet.

8. A motor according to claim 7, wherein the first outer magnetic pole portion, the second outer magnetic pole portion, the third outer magnetic pole portion, and the fourth outer magnetic pole portion are formed of the same member.

9. A motor according to claim 7, wherein the first outer magnetic pole portion and the third outer magnetic pole portion each have a comb-tooth shape that extends in a direction of a rotary shaft of the rotor.

10. A motor according to claim 7, wherein with a rotation center of the rotor taken as a vertex, an angle $\alpha$ formed by a center of a part of the first outer magnetic pole portion which is opposed to the outer circumferential surface of the magnet, and a center of a part of the second outer magnetic pole portion which is opposed to the outer circumferential surface of the magnet, and also the angle $\alpha$ formed by a center of a part of the third outer magnetic pole portion which is opposed to the outer circumferential surface of the magnet, and a center of a part of the fourth outer magnetic pole portion which is opposed to the outer circumferential surface of the magnet, is set in a range of $(270/n) \leqq \alpha \leqq (450/n)$.

11. A motor according to claim 7, wherein an angle $\theta$, which is formed by the first outer magnetic pole portion and the third outer magnetic pole portion, with a rotation center of the rotor taken as a vertex, is expressed by $\theta = (180 - 180/n)$.

12. An optical apparatus, comprising:
a cylindrical magnet which is divided into n portions in a circumferential direction to be alternately magnetized to different magnetic poles;
a rotor which is fixed to an inner diameter portion of the magnet and which is formed of a soft magnetic material;
a first coil which is arranged adjacent to the rotor and adjacent to the magnet in an axial direction of the rotor;
a first outer magnetic pole portion which is excited by the first coil, which is disposed at a center portion of the first coil, and which is opposed to an outer circumferential surface of the magnet within a first predetermined angle range;

a second outer magnetic pole portion which is excited by the first coil, which is adjacent to an outer circumference of the first coil, and which is opposed to the outer circumferential surface of the magnet;

a second coil which is adjacent to the rotor, which is disposed adjacent to the magnet in the axial direction of the rotor, and which is disposed on the substantially same plane as the first coil;

a third outer magnetic pole portion which is excited by the second coil, which is disposed at a center portion of the second coil, and which is opposed to the outer circumferential surface of the magnet within a second predetermined angle range;

a fourth outer magnetic pole portion which is excited by the second coil, which is adjacent to an outer circumference of the second coil, and which is opposed to the outer circumferential surface of the magnet; and an opening amount adjusting member which changes an opening area of an opening portion as an optical path in correspondence with rotation of the rotor.

* * * * *

UNITED STATES PATENT AND TRADEMARK OFFICE
CERTIFICATE OF CORRECTION

PATENT NO. : 7,122,920 B2
APPLICATION NO. : 11/077034
DATED : October 17, 2006
INVENTOR(S) : Masao Mizumaki It is certified that error appears in the above-identified patent and that said Letters Patent is hereby corrected as shown below:

COLUMN 9:
Line 26, "different poles" should read --poles different from--.
Line 47, "different poles" should read --poles different from--.
Line 53, "so as" should read --so that--.
Line 54, "to be" should read --can be--..

COLUMN 12:
Line 9, "projection In" should read --projection 1n--.
Line 14, "portion lg$_1$" should read --lg,--.

COLUMN 13:
Line 54, "even 1f" should read --even if--.
Line 65, "a degree" should read --α degree--.

COLUMN 15:
Line 6, "excited" should read --is excited--.
Line 9, "oppose" should read --opposes--.

COLUMN 16:
Line 18, "portion" should read --portion,--.

COLUMN 17:
Line 54, "inverse" should read --inverse- --.

COLUMN 22:
Line 31, "configured" should read --configured to be--.

COLUMN 23:
Line 39, "opposes" should read --opposing--.

COLUMN 26:
Line 40, "a degree" should read --α degree--.

COLUMN 27:
Line 36, " a degree" should read --α degree--.

UNITED STATES PATENT AND TRADEMARK OFFICE
CERTIFICATE OF CORRECTION

PATENT NO. : 7,122,920 B2
APPLICATION NO. : 11/077034
DATED : October 17, 2006
INVENTOR(S) : Masao Mizumaki It is certified that error appears in the above-identified patent and that said Letters Patent is hereby corrected as shown below:

<u>COLUMN 32</u>:
Line 27, "opposes" should read --opposing--.

Signed and Sealed this

Seventeenth Day of July, 2007

JON W. DUDAS
*Director of the United States Patent and Trademark Office*